(12) United States Patent
Buller et al.

(10) Patent No.: US 10,272,525 B1
(45) Date of Patent: Apr. 30, 2019

(54) THREE-DIMENSIONAL PRINTING SYSTEMS AND METHODS OF THEIR USE

(71) Applicant: Velo3D, Inc., Campbell, CA (US)

(72) Inventors: Benyamin Buller, Cupertino, CA (US); Zachary Ryan Murphree, San Jose, CA (US)

(73) Assignee: VELO3D, INC., Campbell, CA (US)

( * ) Notice: Subject to any disclaimer, the term of this patent is extended or adjusted under 35 U.S.C. 154(b) by 0 days.

(21) Appl. No.: 15/855,744

(22) Filed: Dec. 27, 2017

(51) Int. Cl.
| | |
|---|---|
| *B23K 26/342* | (2014.01) |
| *B33Y 30/00* | (2015.01) |
| *B23K 26/082* | (2014.01) |
| *B23K 26/12* | (2014.01) |
| *B23K 26/142* | (2014.01) |
| *B23K 26/08* | (2014.01) |
| *B33Y 50/02* | (2015.01) |

(52) U.S. Cl.
CPC ........ *B23K 26/342* (2015.10); *B23K 26/0821* (2015.10); *B23K 26/0853* (2013.01); *B23K 26/127* (2013.01); *B23K 26/142* (2015.10); *B33Y 30/00* (2014.12); *B33Y 50/02* (2014.12)

(58) Field of Classification Search
CPC ..... B29C 64/386; B29C 64/30; B29C 64/357; B22F 3/1055; B22F 2003/1056; B22F 2003/1059; G05B 2219/49018; B33Y 30/00; B23K 26/342
See application file for complete search history.

(56) References Cited

U.S. PATENT DOCUMENTS

| | | |
|---|---|---|
| 430,047 A | 6/1890 | Tylee |
| 3,790,787 A | 2/1974 | Geller |
| 3,864,809 A | 2/1975 | Donachie |
| 4,177,087 A | 12/1979 | Hills et al. |
| 4,323,756 A | 4/1982 | Brown et al. |
| 4,359,622 A | 11/1982 | Dostoomian et al. |
| 4,823,158 A | 4/1989 | Casey et al. |
| 4,863,538 A | 9/1989 | Deckard |

(Continued)

FOREIGN PATENT DOCUMENTS

| | | |
|---|---|---|
| CN | 101835554 A | 9/2010 |
| CN | 102076456 A | 5/2011 |

(Continued)

OTHER PUBLICATIONS

Adam, et al. Design for additive manufacturing—lement transitions and aggregated structures. CIRP Journal of Manufacturing Science and Technology. Nov. 2014; 7:20-28.

(Continued)

*Primary Examiner* — Geoffrey S Evans
(74) *Attorney, Agent, or Firm* — Ronit Buller; Wilson Sonsini Goodrich & Rosati

(57) ABSTRACT

The present disclosure describes three-dimensional (3D) printing apparatuses and systems for producing 3D objects. Described herein are printing apparatuses and systems that are configured to facilitate control of debris within an enclosure where one or more printing operations are performed. Printing apparatuses and systems of the present disclosure may each have one or more components, such as, for example, component(s) that are configured to facilitate gas flow trajectories (e.g., turbulent movement) within an enclosure in which a 3D object is printed.

30 Claims, 9 Drawing Sheets

(56) References Cited

U.S. PATENT DOCUMENTS

| | | |
|---|---|---|
| 4,927,582 A | 5/1990 | Bryson |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,396,333 A | 3/1995 | Aleshin et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,859,786 A | 1/1999 | Klein |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 5,951,864 A | 9/1999 | Hazrati et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,376,148 B1 | 4/2002 | Liu et al. |
| 6,391,251 B1 | 5/2002 | Keicher et al. |
| 6,401,001 B1 | 6/2002 | Jang et al. |
| 6,483,596 B1 | 11/2002 | Philippi et al. |
| 6,492,651 B2 | 12/2002 | Kerekes |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |
| 6,688,886 B2 | 2/2004 | Hughes et al. |
| 6,722,872 B1 | 4/2004 | Swanson et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,861,613 B1 | 3/2005 | Meiners et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,949,216 B2 | 9/2005 | Brice et al. |
| 6,955,023 B2 | 10/2005 | Rotheroe |
| 6,963,338 B1 | 11/2005 | Bachelder et al. |
| 6,986,654 B2 | 1/2006 | Imiolek et al. |
| 6,989,115 B2 | 1/2006 | Russell et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,296,599 B2 | 11/2007 | Cox et al. |
| 7,326,377 B2 | 2/2008 | Adams |
| 7,419,632 B2 | 9/2008 | Keller |
| 7,435,368 B2 | 10/2008 | Davidson et al. |
| 7,452,500 B2 | 11/2008 | Uckelmann |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,799,253 B2 | 9/2010 | Hochsmann et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |

(56) References Cited

U.S. PATENT DOCUMENTS

| | | |
|---|---|---|
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 7,991,465 B2 | 8/2011 | Bartic et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,556,981 B2 | 10/2013 | Jones et al. |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 | 12/2014 | Detor et al. |
| 8,915,620 B2 | 12/2014 | Vaes et al. |
| 8,945,456 B2 | 2/2015 | Zenere et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,037,068 B2 | 5/2015 | Kojima |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,272,369 B2 | 3/2016 | Bruck et al. |
| 9,308,583 B2 | 4/2016 | El-Dasher et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,366,422 B2 | 6/2016 | McClure et al. |
| 9,380,304 B1 | 6/2016 | Chang et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,662,840 B1 | 5/2017 | Buller et al. |
| 9,676,145 B2 | 6/2017 | Buller et al. |
| 9,700,908 B2 | 7/2017 | Baker et al. |
| 9,757,760 B2 | 9/2017 | Halder et al. |
| 9,827,717 B2 | 11/2017 | Huang et al. |
| 9,835,568 B2 | 12/2017 | Woods et al. |
| 9,886,526 B2 | 2/2018 | Huang et al. |
| 9,919,360 B2 | 3/2018 | Buller et al. |
| 9,919,476 B2 | 3/2018 | Paternoster et al. |
| 10,035,188 B2 | 7/2018 | Weilhammer et al. |
| 10,035,304 B2 | 7/2018 | Reinarz et al. |
| 10,112,236 B2 * | 10/2018 | Schlick ............... B22F 3/1055 |
| 2002/0017509 A1 | 2/2002 | Ishide et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0090410 A1 | 7/2002 | Tochimoto et al. |
| 2002/0104973 A1 | 8/2002 | Kerekes |
| 2002/0145213 A1 | 10/2002 | Liu et al. |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0201255 A1 | 10/2003 | Manetsberger et al. |
| 2003/0222066 A1 | 12/2003 | Low et al. |
| 2003/0232512 A1 | 12/2003 | Dickinson et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |

(56) References Cited

U.S. PATENT DOCUMENTS

| | | |
|---|---|---|
| 2005/0035285 A1 | 2/2005 | Tan et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar et al. |
| 2005/0258570 A1 | 11/2005 | Kong et al. |
| 2005/0278933 A1 | 12/2005 | Macke et al. |
| 2005/0287031 A1 | 12/2005 | Macke et al. |
| 2006/0003095 A1 | 1/2006 | Bullen et al. |
| 2006/0019232 A1 | 1/2006 | Fischer et al. |
| 2006/0054079 A1 | 3/2006 | Withey et al. |
| 2006/0111807 A1 | 5/2006 | Gothait et al. |
| 2006/0118532 A1 | 6/2006 | Chung et al. |
| 2006/0156978 A1 | 7/2006 | Lipson et al. |
| 2006/0181700 A1 | 8/2006 | Andrews et al. |
| 2006/0187326 A1 | 8/2006 | Spencer et al. |
| 2006/0192322 A1 | 8/2006 | Abe et al. |
| 2006/0208396 A1 | 9/2006 | Abe et al. |
| 2006/0214335 A1 | 9/2006 | Cox et al. |
| 2006/0228248 A1 | 10/2006 | Larsson |
| 2006/0228897 A1 | 10/2006 | Timans et al. |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0019028 A1 | 1/2007 | Renn et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0052836 A1 | 3/2007 | Yamada et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0026338 A1 | 1/2008 | Cinader et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0257672 A1 | 10/2009 | Sullender et al. |
| 2009/0314391 A1 | 12/2009 | Crump et al. |
| 2010/0006228 A1 | 1/2010 | Abe et al. |
| 2010/0044547 A1 | 2/2010 | Higashi et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0174392 A1 | 7/2010 | Fink et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0187713 A1 | 8/2011 | Pershing et al. |
| 2011/0190904 A1 | 8/2011 | Lechmann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0013710 A1 | 1/2012 | Ehrlich et al. |
| 2012/0052145 A1 | 3/2012 | Chen et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0133928 A1 | 5/2012 | Urano et al. |
| 2012/0134386 A1 | 5/2012 | Bender et al. |
| 2012/0139166 A1 | 6/2012 | Abe et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0213615 A1 | 8/2012 | Sakaue |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0235548 A1 | 9/2012 | Cordes et al. |
| 2012/0251378 A1* | 10/2012 | Abe ............... B29C 67/0077 419/55 |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0080866 A1 | 3/2013 | Ogilvie et al. |
| 2013/0089642 A1 | 4/2013 | Lipson et al. |
| 2013/0093866 A1 | 4/2013 | Ohlhues et al. |
| 2013/0101746 A1 | 4/2013 | Keremes et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0186558 A1 | 7/2013 | Comb et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0329098 A1 | 12/2013 | Lim et al. |

(56) References Cited

U.S. PATENT DOCUMENTS

| | | |
|---|---|---|
| 2013/0330470 A1 | 12/2013 | Gersch et al. |
| 2014/0034626 A1 | 2/2014 | Illston |
| 2014/0035182 A1 | 2/2014 | Boyer et al. |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1 | 11/2014 | Fockele et al. |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0084240 A1 | 3/2015 | Shuck et al. |
| 2015/0088295 A1 | 3/2015 | Hellestam et al. |
| 2015/0091200 A1 | 4/2015 | Mech et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0178286 A1 | 6/2015 | Dhollander et al. |
| 2015/0185454 A1 | 7/2015 | Kalkbrenner et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0298211 A1 | 10/2015 | Abe et al. |
| 2015/0298397 A1 | 10/2015 | Chen et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367418 A1 | 12/2015 | Buller et al. |
| 2015/0367419 A1 | 12/2015 | Buller et al. |
| 2015/0367447 A1 | 12/2015 | Buller et al. |
| 2015/0367453 A1 | 12/2015 | Herzog |
| 2015/0367574 A1 | 12/2015 | Araie et al. |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0026337 A1 | 1/2016 | Wassvik et al. |
| 2016/0026889 A1 | 1/2016 | Parkhomenko et al. |
| 2016/0059310 A1 | 3/2016 | Junker et al. |
| 2016/0059352 A1 | 3/2016 | Sparks et al. |
| 2016/0067740 A1 | 3/2016 | Voris et al. |
| 2016/0067779 A1 | 3/2016 | Dautova et al. |
| 2016/0082666 A1 | 3/2016 | De Pena et al. |
| 2016/0082668 A1 | 3/2016 | Perret et al. |
| 2016/0107263 A1 | 4/2016 | Koerber |
| 2016/0114431 A1 | 4/2016 | Cheverton et al. |
| 2016/0114432 A1 | 4/2016 | Ferrar et al. |
| 2016/0114531 A1 | 4/2016 | Chuang et al. |
| 2016/0114535 A1 | 4/2016 | Kritchman et al. |
| 2016/0121399 A1 | 5/2016 | Buller et al. |
| 2016/0121548 A1 | 5/2016 | Nauka et al. |
| 2016/0129502 A1 | 5/2016 | Varetti |
| 2016/0129631 A1 | 5/2016 | Chen et al. |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151860 A1 | 6/2016 | Engeli et al. |
| 2016/0154906 A1 | 6/2016 | Schmidt et al. |
| 2016/0159010 A1 | 6/2016 | Perez et al. |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193785 A1 | 7/2016 | Bell et al. |
| 2016/0193790 A1 | 7/2016 | Shuck et al. |
| 2016/0207109 A1 | 7/2016 | Buller et al. |
| 2016/0214175 A1 | 7/2016 | Nordstrom |
| 2016/0228987 A1 | 8/2016 | Baudimont et al. |
| 2016/0236279 A1 | 8/2016 | Ashton et al. |
| 2016/0236414 A1 | 8/2016 | Reese et al. |
| 2016/0236419 A1 | 8/2016 | Griffin et al. |
| 2016/0241885 A1 | 8/2016 | Ström et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0284123 A1 | 9/2016 | Hare et al. |
| 2016/0288254 A1 | 10/2016 | Pettit et al. |
| 2016/0297006 A1 | 10/2016 | Buller et al. |
| 2016/0297007 A1 | 10/2016 | Buller et al. |
| 2016/0299996 A1 | 10/2016 | Huang |
| 2016/0300356 A1 | 10/2016 | Kitamura et al. |
| 2016/0303687 A1 | 10/2016 | Ljungblad |
| 2016/0311025 A1 | 10/2016 | Kaneko |
| 2016/0318129 A1 | 11/2016 | Hu et al. |
| 2016/0320236 A1 | 11/2016 | Fortin et al. |
| 2016/0320771 A1 | 11/2016 | Huang |
| 2016/0321384 A1 | 11/2016 | Pal et al. |
| 2016/0326880 A1 | 11/2016 | Slavens et al. |
| 2016/0332384 A1 | 11/2016 | De Pena et al. |
| 2016/0339639 A1* | 11/2016 | Chivel .......... B33Y 10/00 |
| 2016/0361874 A1 | 12/2016 | Park et al. |
| 2017/0001371 A1 | 1/2017 | Sobue et al. |

(56) References Cited

U.S. PATENT DOCUMENTS

| | | |
|---|---|---|
| 2017/0001379 A1 | 1/2017 | Long |
| 2017/0014902 A1 | 1/2017 | Tanaka et al. |
| 2017/0021420 A1 | 1/2017 | Buller et al. |
| 2017/0021455 A1* | 1/2017 | Dallarosa ............ B29C 67/0077 |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0087769 A1 | 3/2017 | Lancaster-Larocque et al. |
| 2017/0090461 A1 | 3/2017 | Chong et al. |
| 2017/0102689 A1 | 4/2017 | Khajepour et al. |
| 2017/0106603 A1 | 4/2017 | Pobihun |
| 2017/0123222 A1* | 5/2017 | DeMuth ................ B33Y 10/00 |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144254 A1 | 5/2017 | Buller et al. |
| 2017/0144374 A1 | 5/2017 | Ono et al. |
| 2017/0144874 A1 | 5/2017 | Huebinger et al. |
| 2017/0145586 A1 | 5/2017 | Xiao |
| 2017/0157845 A1 | 6/2017 | Bihari et al. |
| 2017/0165751 A1 | 6/2017 | Buller et al. |
| 2017/0165752 A1 | 6/2017 | Buller et al. |
| 2017/0165753 A1 | 6/2017 | Buller et al. |
| 2017/0165754 A1 | 6/2017 | Buller et al. |
| 2017/0165792 A1 | 6/2017 | Buller et al. |
| 2017/0189963 A1 | 7/2017 | Buller et al. |
| 2017/0216917 A1* | 8/2017 | Zhang ................ B22F 3/1055 |
| 2017/0217095 A1 | 8/2017 | Buller et al. |
| 2017/0225198 A1 | 8/2017 | Nevarez et al. |
| 2017/0232515 A1 | 8/2017 | Demuth et al. |
| 2017/0239719 A1 | 8/2017 | Buller et al. |
| 2017/0239720 A1 | 8/2017 | Levin et al. |
| 2017/0239721 A1 | 8/2017 | Buller et al. |
| 2017/0239752 A1 | 8/2017 | Buller et al. |
| 2017/0239891 A1 | 8/2017 | Buller et al. |
| 2017/0239892 A1 | 8/2017 | Buller et al. |
| 2017/0246810 A1 | 8/2017 | Gold |
| 2017/0252975 A1 | 9/2017 | Park et al. |
| 2017/0259337 A1 | 9/2017 | Furukawa |
| 2017/0259502 A1 | 9/2017 | Chapiro et al. |
| 2017/0259504 A1 | 9/2017 | Lin et al. |
| 2017/0266878 A1 | 9/2017 | Furukawa |
| 2017/0266887 A1 | 9/2017 | Roviaro et al. |
| 2017/0274589 A1 | 9/2017 | Wu et al. |
| 2017/0282245 A1 | 10/2017 | Yasuda et al. |
| 2017/0282294 A1 | 10/2017 | Uchida |
| 2017/0291372 A1 | 10/2017 | Milshtein et al. |
| 2017/0297110 A1 | 10/2017 | Echigo et al. |
| 2017/0304894 A1 | 10/2017 | Buller |
| 2017/0304944 A1 | 10/2017 | Symeonidis et al. |
| 2017/0305140 A1 | 10/2017 | Wüst |
| 2017/0320265 A1 | 11/2017 | Baumann et al. |
| 2017/0333994 A1 | 11/2017 | Schmitt et al. |
| 2017/0334024 A1 | 11/2017 | Buller et al. |
| 2017/0341143 A1 | 11/2017 | Abe et al. |
| 2017/0341183 A1 | 11/2017 | Buller et al. |
| 2017/0341299 A1 | 11/2017 | Kniola et al. |
| 2017/0341307 A1 | 11/2017 | Vilajosana et al. |
| 2017/0348771 A1 | 12/2017 | Kawada et al. |
| 2017/0355146 A1 | 12/2017 | Buller et al. |
| 2017/0355147 A1 | 12/2017 | Buller et al. |
| 2018/0001553 A1 | 1/2018 | Buller et al. |
| 2018/0001556 A1 | 1/2018 | Buller et al. |
| 2018/0001557 A1 | 1/2018 | Buller et al. |
| 2018/0015670 A1* | 1/2018 | Gu ........................ B29C 64/255 |
| 2018/0021855 A1 | 1/2018 | De Lajudie et al. |
| 2018/0056391 A1 | 3/2018 | Buller et al. |
| 2018/0071986 A1 | 3/2018 | Buller et al. |
| 2018/0093416 A1 | 4/2018 | Prexler et al. |
| 2018/0099454 A1 | 4/2018 | Hümmeler et al. |
| 2018/0104892 A1* | 4/2018 | Herzog ................ B33Y 10/00 |
| 2018/0111320 A1 | 4/2018 | Zhao et al. |
| 2018/0117845 A1 | 5/2018 | Buller et al. |
| 2018/0126629 A1 | 5/2018 | Staal et al. |
| 2018/0126649 A1* | 5/2018 | Romano ............ B29C 64/245 |
| 2018/0133635 A1 | 5/2018 | Hofmann et al. |
| 2018/0178286 A1 | 6/2018 | Martin et al. |
| 2018/0185915 A1 | 7/2018 | Beauchamp |
| 2018/0185961 A1* | 7/2018 | Meidani ................ B29C 64/386 |
| 2018/0186079 A1 | 7/2018 | Vilajosana et al. |
| 2018/0207721 A1* | 7/2018 | Schlick ................ B08B 15/00 |
| 2018/0236550 A1* | 8/2018 | Herzog ................ B29C 64/307 |
| 2018/0244034 A1 | 8/2018 | Sutcliffe et al. |
| 2018/0281067 A1 | 10/2018 | Small et al. |
| 2018/0319150 A1 | 11/2018 | Buller et al. |
| 2019/0022944 A1* | 1/2019 | Dohler ................ B29C 64/386 |

FOREIGN PATENT DOCUMENTS

| | | | |
|---|---|---|---|
| CN | 103392153 A | 11/2013 | |
| CN | 103561891 A | 2/2014 | |
| CN | 103611934 A | 3/2014 | |
| CN | 103612393 A | 3/2014 | |
| CN | 103629198 A | 3/2014 | |
| CN | 103676588 A | 3/2014 | |
| CN | 105904729 A | 8/2016 | |
| CN | 105921747 A | 9/2016 | |
| DE | 19939616 A1 | 3/2001 | |
| DE | 102004061836 A1 | 7/2006 | |
| DE | 102007029142 A1 | 1/2009 | |
| DE | 102009036153 A1 | 2/2011 | |
| DE | 102010048335 A1 | 4/2012 | |
| DE | 202013009787 U1 | 12/2013 | |
| DE | 102013208651 A1 | 11/2014 | |
| DE | 102014000022 A1 * | 7/2015 | ........... B29C 64/153 |
| DE | 102014204528 A1 | 9/2015 | |
| EP | 0296818 B1 | 4/1993 | |
| EP | 1466718 A2 | 10/2004 | |
| EP | 1622086 B1 | 9/2008 | |
| EP | 1992709 A1 | 11/2008 | |
| EP | 2277687 A1 | 1/2011 | |
| EP | 2361704 A1 | 8/2011 | |
| EP | 2522446 A1 | 11/2012 | |
| EP | 2583773 A2 | 4/2013 | |
| EP | 2620241 A1 | 7/2013 | |
| EP | 2789413 A1 | 10/2014 | |
| EP | 2832473 A1 | 2/2015 | |
| EP | 2832474 A1 | 2/2015 | |
| EP | 2873751 A1 | 5/2015 | |
| EP | 2992942 A1 | 3/2016 | |
| EP | 3127635 A1 | 2/2017 | |
| EP | 3208077 A1 | 8/2017 | |
| EP | 3263316 A1 | 1/2018 | |
| JP | 2001009921 A | 1/2001 | |
| JP | 2003502184 A | 1/2003 | |
| JP | 2003245981 A | 9/2003 | |
| JP | 2004143581 A | 5/2004 | |
| JP | 2006150977 A | 6/2006 | |
| JP | 2008291318 A | 12/2008 | |
| JP | 2008302607 A | 12/2008 | |
| JP | 2009001900 A | 1/2009 | |
| JP | 2009512579 A | 3/2009 | |
| JP | 2012502178 A | 1/2012 | |
| JP | 2012213971 A | 11/2012 | |
| JP | 2014227587 A | 12/2014 | |
| KR | 20160059726 A | 5/2016 | |
| KR | 20160076708 A | 7/2016 | |
| NO | 317085 B1 | 8/2004 | |
| SE | 524467 C2 | 8/2004 | |
| WO | WO-9208592 A1 | 5/1992 | |
| WO | WO-9511100 A1 | 4/1995 | |
| WO | WO-9711837 A1 | 4/1997 | |
| WO | WO-9828124 A2 | 7/1998 | |
| WO | WO-9933641 A1 | 7/1999 | |
| WO | WO-0102160 A1 | 1/2001 | |
| WO | WO-0177988 A2 | 10/2001 | |
| WO | WO-2004037469 A1 | 5/2004 | |
| WO | WO-2006066939 A1 | 6/2006 | |
| WO | WO-2008028443 A2 | 3/2008 | |
| WO | WO-2008049384 A1 | 5/2008 | |
| WO | WO-2008064620 A1 | 6/2008 | |
| WO | WO-2008067496 A2 | 6/2008 | |
| WO | WO-2008074287 A1 | 6/2008 | |
| WO | WO-2008096105 A1 | 8/2008 | |

(56) References Cited

FOREIGN PATENT DOCUMENTS

| WO | WO-2008128502 A2 | 10/2008 |
|---|---|---|
| WO | WO-2009015619 A2 | 2/2009 |
| WO | WO-2009096750 A2 | 8/2009 |
| WO | WO-2010026396 A2 | 3/2010 |
| WO | WO-2013092997 A1 | 6/2013 |
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015025171 A2 | 2/2015 |
| WO | WO-2015034362 A1 | 3/2015 |
| WO | WO-2015040433 A2 | 3/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017054842 A1 | 4/2017 |
| WO | WO-2017079091 A1 | 5/2017 |
| WO | WO-2017100695 A1 | 6/2017 |
| WO | WO-2017143077 A1 | 8/2017 |
| WO | WO-2017179001 A1 | 10/2017 |
| WO | WO-2018005439 | 1/2018 |
| WO | WO-2018064349 A1 | 4/2018 |
| WO | WO-2018075741 A1 | 4/2018 |
| WO | WO-2018106586 A1 | 6/2018 |
| WO | WO-2018128695 A2 | 7/2018 |
| WO | WO-2018129089 A1 | 7/2018 |
| WO | WO-2018160807 A1 | 9/2018 |
| WO | WO-2018183396 A1 | 10/2018 |

OTHER PUBLICATIONS

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

Anusci, Victor. Aerosint is Developing the First Commercial Multi-powder SLS 3D Printer. 3D Printing Media Network. Web. Published Jan. 28, 2018. 4 pages. URL:<https://www.3dprintingmedia.network/aerosint-multi-powder-sls-3d-printer/>.

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR_kR6ua0GOMlyJlmpCKh342iL1.

Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.

Childs, et al. Raster scan of selective laser melting of the surface layer of a tool steel powder bed. Proc. IMechE. Jan. 26, 2005; vol. 219, Part B, pp. 379-384.

Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.

Chivel, et al. On-line temperature monitoring in selective laser sintering/melting. Physics Procedia. Dec. 31, 2010; (5):515-521.

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.

Co-pending U.S. Appl. No. 15/719,084, filed Sep. 28, 2017.
Co-pending U.S. Appl. No. 15/719,133, filed Sep. 28, 2017.
Co-pending U.S. Appl. No. 15/719,229, filed Sep. 28, 2017.
Co-pending U.S. Appl. No. 15/788,364, filed Oct. 19, 2017.
Co-pending U.S. Appl. No. 15/788,418, filed Oct. 19, 2017.
Co-pending U.S. Appl. No. 15/788,463, filed Oct. 19, 2017.
Co-pending U.S. Appl. No. 15/788,495, filed Oct. 19, 2017.
Co-pending U.S. Appl. No. 15/788,532, filed Oct. 19, 2017.
Co-pending U.S. Appl. No. 15/788,568, filed Oct. 19, 2017.
Co-pending U.S. Appl. No. 15/788,662, filed Oct. 19, 2017.
Co-pending U.S. Appl. No. 15/803,675, filed Nov. 3, 2017.
Co-pending U.S. Appl. No. 15/803,683, filed Nov. 3, 2017.
Co-pending U.S. Appl. No. 15/803,686, filed Nov. 3, 2017.
Co-pending U.S. Appl. No. 15/803,688, filed Nov. 3, 2017.
Co-pending U.S. Appl. No. 15/803,692, filed Nov. 3, 2017.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/853,700, filed Dec. 22, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/870,561, filed Jan. 12, 2018.
Co-pending U.S. Appl. No. 15/871,763, filed Jan. 15, 2018.
Co-pending U.S. Appl. No. 15/873,832, filed Jan. 17, 2018.
Co-pending U.S. Appl. No. 15/886,544, filed Feb. 1, 2018.
Co-pending U.S. Appl. No. 15/893,523, filed Feb. 9, 2018.

Craeghs, et al. Feedback control of layerwise laser melting using optical sensors. Physics Procedia. Dec. 2010; 5:505-514.

Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.

David et al. Welding: Solidification and microstructure. The Journal of the Minerals, Metals & Materials Society (TMS). Jun. 2003, vol. 55, Issue 6, pp. 14-20.

Direct Manufacturing: ARCAM. Uploaded on Jun. 6, 2011. 2 pages. https://www.youtube.com/watch?v=M_qSnjKN7f8.

EOS. Direct Metal Laser Sintering Published Aug. 22, 2012. https://www.youtube.com/watch?v=cRE-Pzl6uZA.

European Search Report and Search Opinion dated Nov. 30, 2017 for European Patent Application No. EP17178143.8.

Ex Parte Quayle Action dated Apr. 19, 2017 for U.S. Appl. No. 15/374,821.

Extended European Search Report dated Jul. 7, 2017 for European Patent Application No. EP17156707.6.

Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.

Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.

(56) References Cited

OTHER PUBLICATIONS

Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Hauser, et al. Further Developments in Process Mapping and modelling in direct metal selective laser melting. Aug. 2004, 15th solid Free Form Fabrication Proceedings. Austin, Texas, pp. 448-459.
Hussein. The development of Lightweight Cellular Structures for Metal Additive Manufacturing. Nov. 2013, thesis of University of Exeter, pp. 1-228.
International Search Report and Written Opinion dated Jan. 9, 2018 for International PCT Patent Application No. PCT/2017/054043.
International Search Report and Written Opinion dated Jan. 16, 2017 for International PCT Patent Application No. PCT/US2016/059781.
International Search Report and Written Opinion dated Feb. 14, 2017 for International PCT Patent Application No. PCT/US2016/042818.
International Search Report and Written Opinion dated Feb. 19, 2016 for International PCT Patent Application No. PCT/US2015/059790.
International Search Report and Written Opinion dated Apr. 5, 2017 for International PCT Patent Application No. PCT/US2016/066000.
International search report and written opinion dated Apr. 11, 2016 for PCT/US2015/065297.
International Search Report and Written Opinion dated May 18, 2017 for International PCT Patent Application No. PCT/US2017/018191.
International Search Report and Written Opinion dated Aug. 30, 2017 for International PCT Patent Application No. PCT/US2017/039422.
International search report and written opinion dated Sep. 20, 2016 for PCT/US2016/034454.
International Search Report and Written Opinion dated Oct. 18, 2016 for International PCT Patent Application No. PCT/US2016/041895.
International search report and written opinion dated Oct. 30, 2015 for PCT Application No. US2015/036802.
International search report and written opinion dated Sep. 13, 2016 for PCT Application No. US-2016034857.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1):7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Powder deposition and sintering for a two-powder approach to solid freeform fabrication. Department of Mechanical Engineering, University of Florida. Aug. 1998; 169-173.
Laser Engineered Net Shaping (LENS) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Merriam-Webster. Definition of "reservoir". Retrieved Dec. 21, 2017. 13 pages. URL:< https://merriam-webster.com/dictionary/reservoir>.
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):36*-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb—Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of Allowability dated Oct. 17, 2017 for U.S. Appl. No. 14/744,910.
Notice of allowance dated Jan. 5, 2017 for U.S. Appl. No. 15/085,884.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of Allowance dated Aug. 7, 2017 for U.S. Appl. No. 14/744,910.

(56) References Cited

OTHER PUBLICATIONS

Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 8, 2017 for U.S. Appl. No. 15/435,128.
Notice of Allowance dated Dec. 9, 2016 for U.S. Appl. No. 15/188,939.
Notice of Allowance dated Dec. 11, 2017 for U.S. Appl. No. 15/435,120.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office Action dated Jan. 2, 2018 for U.S. Appl. No. 15/288,251.
Office action dated Jan. 7, 2016 for U.S. Appl. No. 14/744,859.
Office action dated Jan. 11, 2016 for U.S. Appl. No. 14/745,032.
Office Action dated Jan. 24, 2018 for U.S. Appl. No. 15/615,004.
Office Action dated Jan. 25, 2018 for U.S. Appl. No. 15/634,727.
Office Action dated Feb. 7, 2017 for U.S. Appl. No. 14/744,988.
Office Action dated Feb. 7, 2018 for U.S. Appl. No. 15/614,979.
Office Action dated Feb. 7, 2018 for U.S. Appl. No. 15/719,229.
Office Action dated Feb. 8, 2017 for U.S. Appl. No. 14/744,859.
Office action dated Feb. 10, 2016 for U.S. Appl. No. 14/744,910.
Office Action dated Feb. 14, 2018 for U.S. Appl. No. 15/634,228.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office Action dated Mar. 7, 2018 for U.S. Appl. No. 15/399,186.
Office Action dated Mar. 10, 2016 for U.S. Appl. No. 14/744,675.
Office Action dated Mar. 23, 2017 for U.S. Appl. No. 15/399,186.
Office Action dated Apr. 28, 2017 for U.S. Appl. No. 15/374,616.
Office Action dated Jun. 15, 2017 for U.S. Appl. No. 15/288,251.
Office action dated Jun. 29, 2016 for U.S. Appl. No. 14/744,859.
Office action dated Jun. 29, 2017 for U.S. Appl. No. 15/435,128.
Office action dated Jul. 1, 2016 for U.S. Appl. No. 14/745,032.
Office Action dated Jul. 3, 2017 for U.S. Appl. No. 15/435,120.
Office action dated Jul. 19, 2016 for U.S. Appl. No. 15/085,884.
Office action dated Jul. 21, 2016 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office Action dated Aug. 25, 2016 for U.S. Appl. No. 14/744,988.
Office action dated Aug. 25, 2017 for U.S. Appl. No. 15/339,712.
Office action dated Sep. 10, 2015 for U.S. Appl. No. 14/744,675.
Office action dated Sep. 11, 2017 for U.S. Appl. No. 15/374,821.
Office action dated Sep. 13, 2016 for U.S. Appl. No. 15/188,939.
Office Action dated Sep. 15, 2017 for U.S. Appl. No. 15/374,616.
Office action dated Sep. 18, 2017 for U.S. Appl. No. 15/634,228.
Office action dated Oct. 2, 2015 for U.S. Appl. No. 14/744,955.
Office Action dated Oct. 19, 2017 for U.S. Appl. No. 15/399,186.
Office action dated Nov. 1, 2016 for U.S. Appl. No. 15/085,884.
Office action dated Nov. 12, 2015 for U.S. Appl. No. 14/745,108.
Office Action dated Nov. 16, 2017 for U.S. Appl. No. 15/634,267.
Office action dated Nov. 18, 2016 for U.S. Appl. No. 15/188,939.
Office action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. Lens 850R 3D Printer for Structual Metals. Optomec. YouTube—Web. Published on Jun 3, 2012. 3 pages URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Saunders, Marc. Real-time AM monitoring opens up new process control opportunities. Web: LinkedIn. Published on Jan. 3, 2018. 12 pages. URL:< https://www.linkedin.com/pulse/real-time-am-monitoring-opens-new-process-control-marc-saunders/>.
SCHOTT. TIE-19: Temperature Coefficient of the Refractive Index. Technical Information: Advanced Optics. SCHOTT AG. Jul. 2016. 10 pages.
SCHOTT. TIE-19: Temperature Coefficient of the Refractive Index. Technical Information: Advanced Optics. SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484 DOI 10.1007/500170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Yin. Accurately quantifying process-relevant powder properties for AMPM applications. Freeman Technology. May 2014. 39 pages.
Arnet et al. Extending Laser Bending for the Generation of Convex Shapes. Proc. Instn. Mech. Engrs., vol. 209, Dec. 1, 1995, pp. 433-442.
Ashby, Mike. Teach Yourself: Phase Diagrams and Phase Transformations. 5th Edition, Mar. 2009, Cambridge. 55 pages.
Bonnet, M. Advances in the Design of Pneumatic Conveyors. International Chemical Engineering, vol. 25, No. 3, Jul. 1985, pp. 387-405.
Co-pending U.S. Appl. No. 15/909,388, filed Mar. 1, 2018.
Co-pending U.S. Appl. No. 15/909,396, filed Mar. 1, 2018.
Co-pending U.S. Appl. No. 15/909,406, filed Mar. 1, 2018.
Co-pending U.S. Appl. No. 15/909,783, filed Mar. 1, 2018.
Co-pending U.S. Appl. No. 15/909,784, filed Mar. 1, 2018.

(56) References Cited

OTHER PUBLICATIONS

Co-pending U.S. Appl. No. 15/909,806, filed Mar. 1, 2018.
Co-pending U.S. Appl. No. 15/909,809, filed Mar. 1, 2018.
Co-pending U.S. Appl. No. 15/909,826, filed Mar. 1, 2018.
Co-pending U.S. Appl. No. 15/937,778, filed Mar. 27, 2018.
Co-pending U.S. Appl. No. 15/937,790, filed Mar. 27, 2018.
Co-pending U.S. Appl. No. 15/937,798, filed Mar. 27, 2018.
Co-pending U.S. Appl. No. 15/937,812, filed Mar. 27, 2018.
Co-pending U.S. Appl. No. 15/937,817, filed Mar. 27, 2018.
Co-pending U.S. Appl. No. 16/030,795, filed Jul. 9, 2018.
Co-pending U.S. Appl. No. 16/031,896, filed Jul. 10, 2018.
Dahotre et al. Laser Fabrication and Machining of Materials. Springer; 2008 edition (Nov. 26, 2007).561 pages. DOI: 10.1007/978-0-387-72344-0.
De Dietrich Process Systems, Inc. Powder Pump™. Product Brochure. Created Jul. 3, 2012. 2 pages.
Doxygen. CGAL 4.11.1—Kinetic Data Structures. User Manual. Web. Published Apr. 8, 2006. 4 pages. URL:< https://doc.cgal.org/latest/Manual/how_to_cite_cgal.html>.
Gaudin, Sharon. Researcher works to make 3D-printed metals stronger, customizable. Oct. 2014. Accessed online on Mar. 22, 2018. 4 pages. URL:< https://www.computerworld.com/article/2838780/researcher-works-to-make-3d-printed-materials-stronger-customizable.html>.
Geiger, et al. The Mechanisms of Laser Forming. Annals of the CIRP, vol. 42, Jan. 1993, pp. 301-304.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Hu, et al. Computer simulation and experimental investigation of sheet metal bending using laser beam scanning. International Journal of Machine Tools and Manufacture, 41, Mar. 2001, pp. 589-607.
Hu et al. Experimental and numerical modeling of buckling instability of laser sheet forming. International Journal of Machine Tools & Manufacture, 42, Oct. 2002, pp. 1427-1439.
integrativemodeling.org. IMP, the Integrative Modeling Platform. Web. Published Jul. 26, 2013.1 page. URL:< https://integrativemodeling.org/>.
International Search Report and Written Opinion dated Feb. 12, 2018 for International PCT Patent Application No. PCT/US2017/057340.
International Search Report and Written Opinion dated Sep. 20, 2016 for International PCT Patent Application No. PCT/US2016/034454.
Maji et al. Finite Element Analysis and Experimental Investigations on Laser Bending of AISI304 Stainless Steel Sheet. Procedia Engineering 64, Dec. 2013, pp. 528-535.
PCT/US2017/064474 International Search Report and Written Opinion dated Apr. 30, 2018.
PCT/US2018/012250 International Search Report and Written Opinion dated Apr. 30, 2018.
Rhinehart, R.R. §2.13 Control Theory: Mode-Based Control, in Bela G. Liptak, Instrument Engineers' Handbook, vol. 2: Process Control and Optimization, 209-213. CRC Press; 4 edition (Sep. 29, 2005).ISBN-13: 978-0849310812.
RP Photonics Consulting GmbH. Definition of "Optical Intensity". Encyclopedia of Laser Physics and Technology. Jun. 2012. 3 pages. URL:< https://www.rp-photonics.com/optical_intensity.html>.
Sandvik Materials Technology website. Accessed Nov. 14, 2014. http://www.smt.sandvik.com/en/products/metal-powder/additive-manufacturing/.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.
Symeonidis, Kimon. The Controlled Diffusion Solidification Process: Fundamentals and Principles. Ph.D. Thesis. Worcester Polytechnic Institute. Apr. 2009. 137 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/339,712 Notice of Allowance dated Jul. 10, 2018.
U.S. Appl. No. 15/339,712 Notice of Allowance dated Jun. 18, 2018.
U.S. Appl. No. 15/339,712 Notice of Allowance dated May 23, 2018.
U.S. Appl. No. 15/339,712 Office Action dated Jan. 10, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Office Action dated Mar. 26, 2018.
U.S. Appl. No. 15/374,821 Notice of Allowance dated Apr. 4, 2018.
U.S. Appl. No. 15/435,090 Office Action dated May 18, 2018.
U.S. Appl. No. 15/435,110 Office Action dated Apr. 19, 2018.
U.S. Appl. No. 15/614,979 Office Action dated Jun. 8, 2018.
U.S. Appl. No. 15/615,004 Office Action dated Jun. 8, 2018.
U.S. Appl. No. 15/634,228 Office Action dated Jun. 14, 2018.
U.S. Appl. No. 15/634,267 Office Action dated Apr. 3, 2018.
U.S. Appl. No. 15/634,727 Office Action dated May 25, 2018.
U.S. Appl. No. 15/719,084 Office Action dated Jul. 12, 2018.
U.S. Appl. No. 15/719,133 Office Action dated Mar. 28, 2018.
U.S. Appl. No. 15/830,470 Office Action dated Jul. 5, 2018.
U.S. Appl. No. 15/853,700 Office Action dated Apr. 6, 2018.
U.S. Appl. No. 15/870,561 Office Action dated Jun. 15, 2018.
U.S. Appl. No. 15/871,763 Office Action dated Apr. 19, 2018.
U.S. Appl. No. 15/893,523 Notice of Allowance dated Jun. 15, 2018.
U.S. Appl. No. 15/893,523 Notice of Allowance dated May 7, 2018.
U.S. Appl. No. 15/909,784 Office Action dated Jul. 13, 2018.
U.S. Appl. No. 15/909,826 Office Action dated May 2, 2018.
Bremen et al. Selective Laser Melting. Laser Technik Journal. vol. 9, No. 2, Apr. 2012. 6 pages.
Calvert, Jack G. Glossary of Atmospheric Chemistry Terms (Recommendations 1990). Pure & Appl. Chem., vol. 62, No. 11, Jan. 1, 1990, pp. 2167-2219.
Co-pending U.S. Appl. No. 16/177,090, filed Oct. 31, 2018.
Co-pending U.S. Appl. No. 16/183,557, filed Nov. 7, 2018.
Co-pending U.S. Appl. No. 16/195,810, filed Nov. 19, 2018.
Das et al. Producing metal parts with selective laser sintering/hot isostatic pressing. JOM; Dec. 1998, vol. 50, Issue 12, pp. 17-20.
*Formlabs* v. *DWS*. Civil Action filed on Jun. 29, 2018 in the United States Court for the Eastern District of Virginia. Case No. 1:18-cv-00810-CMH-IDD. 13 pages.
IUPAC. "Inert gas". IUPAC Compendium of Chemical Terminology. Published Feb. 24, 2014.< http://goldbook.iupac.org/html/I/I03027.html.
U.S. Appl. No. 15/374,442 Notice of Allowance dated Oct. 3, 2018.
U.S. Appl. No. 15/490,219 Office Action dated Oct. 12, 2018.
U.S. Appl. No. 15/614,979 Office Action dated Nov. 5, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,666 Office Action dated Oct. 18, 2018.
U.S. Appl. No. 15/719,229 Office Action dated Oct. 5, 2018.
U.S. Appl. No. 15/788,495 Office Action dated Oct. 3, 2018.
U.S. Appl. No. 15/830,421 Office Action dated Nov. 13, 2018.
U.S. Appl. No. 15/861,553 Office Action dated Dec. 14, 2018.
U.S. Appl. No. 15/870,561 Office Action dated Nov. 19, 2018.
U.S. Appl. No. 15/871,763 Notice of Allowance dated Nov. 5, 2018.
U.S. Appl. No. 15/909,388 Office Action dated Dec. 14, 2018.
U.S. Appl. No. 15/937,798 Office Action dated Oct. 26, 2018.
U.S. Appl. No. 15/937,817 Office Action dated Nov. 23, 2018.
Ryan et al. Fabrication methods of porous metals for use in orthopaedic applications. Biomaterials. May 2006; vol. 27, Issue 13, pp. 2651-2670.
Barriobero-Vila et al. Inducing Stable $\alpha + \beta$ Microstructures during Selective Laser Melting of Ti—6Al—4V Using Intensified Intrinsic Heat Treatments. Materials (Basel). Mar. 2017; 10(3): 268.
Bayerlein et al. Validation of modeling assumptions for the buildup simulation of laser beam melting on the basis of the residual stress

(56) References Cited

OTHER PUBLICATIONS distribution. Proceedings of ECCOMAS Congress 2016: VII European Congress on Computational Methods in Applied Sciences and Engineering. Crete Island. Greece, Jun. 5, 2016-Jun. 10, 2016. 11 pages.
Co-pending U.S. Appl. No. 16/125,644, filed Sep. 7, 2018.
Co-pending U.S. Appl. No. 16/137,295, filed Sep. 20, 2018.
EP15809160.3 European Search Report dated Aug. 7, 2018.
EP15866668.5 European Search Report dated Aug. 7, 2018.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/374,535 Notice of Allowance dated Sep. 24, 2018.
U.S. Appl. No. 15/374,616 Office Action dated Aug. 15, 2018.
U.S. Appl. No. 15/399,186 Notice of Allowance dated Sep. 17, 2018.
U.S. Appl. No. 15/435,065 Office Action dated Aug. 16, 2018.
U.S. Appl. No. 15/435,078 Office Action dated Aug. 16, 2018.
U.S. Appl. No. 15/634,267 Office Action dated Sep. 6, 2018.
U.S. Appl. No. 15/634,727 Office Action dated Sep. 20, 2018.
U.S. Appl. No. 15/719,133 Office Action dated Sep. 24, 2018.
U.S. Appl. No. 15/803,686 Office Action dated Sep. 19, 2018.
U.S. Appl. No. 15/803,688 Office Action dated Sep. 20, 2018.
U.S. Appl. No. 15/830,421 Office Action dated Jul. 26, 2018.
U.S. Appl. No. 15/853,700 Office Action dated Sep. 11, 2018.
U.S. Appl. No. 15/861,548 Office Action dated Sep. 6, 2018.
U.S. Appl. No. 15/861,553 Office Action dated Aug. 7, 2018.
U.S. Appl. No. 15/871,763 Notice of Allowance dated Aug. 15, 2018.
U.S. Appl. No. 15/871,763 Notice of Allowance dated Sep. 17, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,806 Office Action dated Aug. 13, 2018.
U.S. Appl. No. 15/909,809 Office Action dated Aug. 10, 2018.
U.S. Appl. No. 15/909,826 Notice of Allowance dated Aug. 30, 2018.
U.S. Appl. No. 15/937,778 Office Action dated Sep. 21, 2018.
U.S. Appl. No. 15/937,790 Office Action dated Sep. 25, 2018.
U.S. Appl. No. 15/937,812 Office Action dated Sep. 7, 2018.
U.S. Appl. No. 15/435,110 Notice of Allowance dated Sep. 25, 2018.
Xu et al. In situ tailoring microstructure in additively manufactured Ti—6Al—4V for superior mechanical performance. Acta Materialia. vol. 125, Feb. 15, 2017, pp. 390-400.
Co-pending U.S. Appl. No. 16/245,183, filed Jan. 10, 2019.
Co-pending U.S. Appl. No. 16/248,665, filed Jan. 15, 2019.
Co-pending U.S. Appl. No. 16/253,103, filed Jan. 21, 2019.
Co-pending U.S. Appl. No. 16/291,759, filed Mar. 4, 2019.
Kopeliovich, Dmitri. Electropolishing. SubsTech: Substances & Technologies. Web Article. Dec. 14, 2013. Printed Jan. 13, 2019. 5 pages. URL:<http://www.substech.com/dokuwiki/doku.php?id=electropolishing.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/399,186 Notice of Allowance dated Dec. 20, 2018.
U.S. Appl. No. 15/435,078 Office Action dated Jan. 10, 2019.
U.S. Appl. No. 15/435,110 Notice of Allowance dated Dec. 20, 2018.
U.S. Appl. No. 15/479,531 Office Action dated Jan. 9, 2019.
U.S. Appl. No. 15/634,228 Notice of Allowance dated Feb. 20, 2019.
U.S. Appl. No. 15/634,267 Notice of Allowance dated Dec. 28, 2018.
U.S. Appl. No. 15/634,727 Notice of Allowance dated Feb. 7, 2019.
U.S. Appl. No. 15/719,084 Office Action dated Feb. 8, 2019.
U.S. Appl. No. 15/803,686 Notice of Allowance dated Feb. 19, 2019.
U.S. Appl. No. 15/861,544 Office Action dated Feb. 15, 2019.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,784 Office Action dated Jan. 18, 2019.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,826 Office Action dated Feb. 13, 2019.
U.S. Appl. No. 15/937,778 Office Action dated Feb. 12, 2019.
U.S. Appl. No. 15/937,790 Office Action dated Jan. 31, 2019.
U.S. Appl. No. 15/937,812 Office Action dated Feb. 7, 2019.

* cited by examiner

THREE-DIMENSIONAL PRINTING SYSTEMS AND METHODS OF THEIR USE

BACKGROUND

Three-dimensional (3D) printing is a process for making objects under computer control. Often, the objects are made sequentially by forming multiple layers of material that are joined together to form a 3D object having desired dimensions. A variety of materials can be used, including metal, ceramic, or polymeric materials. 3D printing systems can vary in their methods of forming the multiple layers, such as by melting, sintering, softening, hardening, or liquifying. The quality of a 3D object can depend on the processing conditions for printing the 3D object. For example, the type of material, the temperatures used to perform the joining, as well as atmospheric conditions surrounding the 3D object during its formation, which may influence characteristics, such as the shape, roughness, and porosity, of the 3D object. Currently needed are improved 3D printing systems and methods for forming high quality 3D objects, at a competitive cost.

SUMMARY

In one aspect, systems, apparatuses, methods, controllers, and/or non-transitory computer-readable media (e.g., software) for printing three-dimensional objects is described.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume; one or more windows coupled to the ceiling wall, wherein the one or more windows is configured to transmit the one or more laser beams therethrough to the internal volume; one or more galvanometer scanners configured to move the one or more laser beams within a processing cone region within the internal volume of the processing chamber, wherein the one or more galvanometer scanners is external to the internal volume of the processing chamber; a gas flow system operationally coupled with the processing chamber and configured to provide a flow of gas across at least a portion of the processing cone region, wherein during the printing the flow of gas maintains a debris concentration of about 1 to about 1,000 milligrams per cubic meter (a) in the processing cone region and (b) at least about 20 millimeters above the surface of the powder bed, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume; one or more windows coupled to the ceiling wall, wherein the one or more windows is configured to transmit the one or more laser beams therethrough to the internal volume; one or more galvanometer scanners configured to move the one or more laser beams within a processing cone region within the internal volume of the processing chamber, wherein the one or more galvanometer scanners is external to the internal volume of the processing chamber; a gas flow system operationally coupled with the processing chamber and configured to provide a flow of gas across at least a portion of the processing cone region, wherein during the printing the flow of gas maintains a debris concentration for debris particles having diameters of about 0.5 micrometers or greater of about 0.5 to about 1,000 particles per cubic centimeter (a) in the processing cone region and (b) at least about 20 millimeters above the surface of the powder bed, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In another aspect, an apparatus for printing a three-dimensional object, comprises: a platform configured to support a powder bed comprising a powder material; a layer forming device configured to form at least one layer of the powder material as part of the powder bed, wherein the layer forming device includes a blade or a roller configured to translate in a first direction over a surface of the powder bed to planarize the surface of the powder bed; an elevator operationally coupled with the platform, wherein the elevator comprises a motor configured to translate the platform in a second direction substantially perpendicular to the first direction; a processing chamber having an internal volume configured to enclose the surface of the powder bed during the printing, wherein the processing chamber includes a ceiling wall; one or more lasers configured to generate one or more laser beams that (i) melts at least a portion of the powder bed to a molten material as part of the three-dimensional object during the printing, and (ii) forms gas-borne debris within the internal volume of the processing chamber; one or more windows coupled to the ceiling wall, wherein the one or more windows is configured to transmit the one or more laser beams therethrough to the internal volume; one or more galvanometer scanners configured to move the one or more laser beams within the internal volume of the processing chamber, wherein the one or more galvanometer scanners is external to the internal volume of the processing chamber; a gas flow system operationally coupled with the processing chamber and configured to provide a flow of gas across at least a portion of each of the one or more laser beams, wherein during the printing, a number of debris particles having diameters greater than about 0.5 micrometers encountered by each of the one or more laser beams is between about 10 and about 10,000, wherein the printing results in the three-dimensional object having a porosity of about 1% or less by volume; and one or more controllers operationally coupled with the elevator, the layer forming device, the one or more galvanometer scanners, and the gas flow system, which one or more controllers is configured to direct (I) the elevator to translate the platform in the second direction, (II) the layer forming device to translate in the first direction, (III) the one or more galvanometer scanners to direct the one or more laser beams at the powder bed along a trajectory, and (IV) the gas flow system to provide the flow of gas.

In some embodiments, the debris concentration within the at least the portion of the processing cone region varies during the printing. In some embodiments, the wherein the gas-borne debris within the internal volume is formed during the melting of the at least the portion of the powder bed to the molten material as part of the three-dimensional object. In some embodiments, the during the printing, the gas flow system is configured to facilitate movement of the gas-borne debris at least in the processing cone region. In some embodiments, the gas flow system is configured to facilitate the movement of the gas-borne debris corresponding to a turbulent movement at least in the processing cone region. In some embodiments, the turbulent movement comprises a cyclic movement. In some embodiments, the turbulent movement comprises a backflow or a standing vortex. In some embodiments, at least one valve of the gas flow system is configured to facilitate the movement of the gas-borne debris. In some embodiments, the an internal shape of the processing chamber is configured to facilitate the movement of the gas-borne debris. In some embodiments, a wall of the processing chamber is configured to facilitate the movement of the gas-borne debris. In some embodiments, the wall of the processing chamber is a side wall. In some embodiments, the debris concentration is present at a height of at least about 30 millimeters above the surface of the powder bed. In some embodiments, the debris concentration is present at a height of at least about 50 millimeters above the surface of the powder bed. In some embodiments, the gas flow system is configured to provide at least a portion of the flow of gas in a direction that is substantially parallel to the surface of the powder bed and/or the platform. In some embodiments, the flow of gas has a peak horizontal velocity ranging from about 0.2 to about 2 meters per second (m/s). In some embodiments, the flow of gas has a peak horizontal velocity within a height of about 15 and about 100 millimeters (mm) above the surface of the powder bed and/or the platform. In some embodiments, the flow of gas has a peak horizontal velocity height that varies along a length of the powder bed and/or the platform. In some embodiments, each of the one or more lasers is configured to generate a laser beam having a power density ranging from about 100 to about 30,000 Kilo Watts per centimeter squared (kW/cm2), as measured at the surface of the powder bed. In some embodiments, the apparatus further comprises an optical system configured to modify at least one characteristic of the one or more laser beams, wherein the optical system is configured to generate a focused or a defocused laser beam at the surface of the powder bed. In some embodiments, the apparatus further comprises a build module removably coupled to the processing chamber during the printing, wherein the processing chamber is configured decouple from the build module after the printing. In some embodiments, the processing chamber is configured to allow an external atmosphere to enter the internal volume after the printing. In some embodiments, during the printing, the gas flow system is configured to change a direction of the flow of gas within the internal volume. In some embodiments, during the printing, the gas flow system is configured change a velocity of the flow of gas within the internal volume during. In some embodiments, the apparatus is configured to print the three-dimensional object with a surface roughness (Ra) of at most about 50 micrometers as measured along a surface of the 3D object that is at an angle ranging from about 85 to about 120 degrees in relation to a support surface of the platform during the printing. In some embodiments, the gas-borne debris comprises particles having diameters ranging from about 0.1 micrometer to about 1 micrometer. In some embodiments, during the printing, the apparatus is configured generate at least about 5 milligrams of the gas-borne material debris per second. In some embodiments, the gas-borne debris comprises particles having at least about 10% metal oxide measured as volume per volume. In some embodiments, during the printing, the apparatus is configured to melt from about 1 to about 50 cubic centimeters per hour ($cm^3$/hr) of the molten material per laser. In some embodiments, the flow of gas enters the internal volume via one or more inlet openings and exits the internal volume via one or more outlet openings, which openings are configured to facilitate the movement of the gas-borne debris. In some embodiments, the one or more inlet openings and/or the one or more outlet openings correspond to openings of a perforated plate, a screen, a mesh or a gas permeable material. In some embodiments, the one or more inlet openings and/or the one or more outlet openings are configured to facilitate the flow of gas from the one or more inlet openings to the one or more outlet openings in a substantially horizontal direction. In some embodiments, the one or more inlet openings and/or the one or more outlet openings are configured to facilitate the flow of gas from the one or more inlet openings to the one or more outlet openings such that it flows substantially parallel with respect to the surface of the powder bed. In some embodiments, the one or more inlet openings are within an inlet region coupled to a ceiling of the processing chamber, and the one or more outlet openings are within a side wall or a floor of the processing chamber. In some embodiments, the one or more inlet openings are within an inlet region coupled to a first side wall of the processing chamber, and the one or more outlet openings are within a second side wall or a floor of the processing chamber. In some embodiments, the number of debris particles is within a laser beam volume within the internal volume of the processing chamber.

Another aspect of the present disclosure provides a method for using the apparatuses disclosed herein (e.g., according to its intended function).

In another aspect, an apparatus for printing one or more 3D objects comprises a controller that is programmed to direct a mechanism used in a 3D printing methodology to implement (e.g., effectuate) any of the method and/or functions of the apparatuses disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method and/or functions of the apparatuses disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods and/or functions of the apparatuses disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods and/or functions of the apparatuses disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 1:
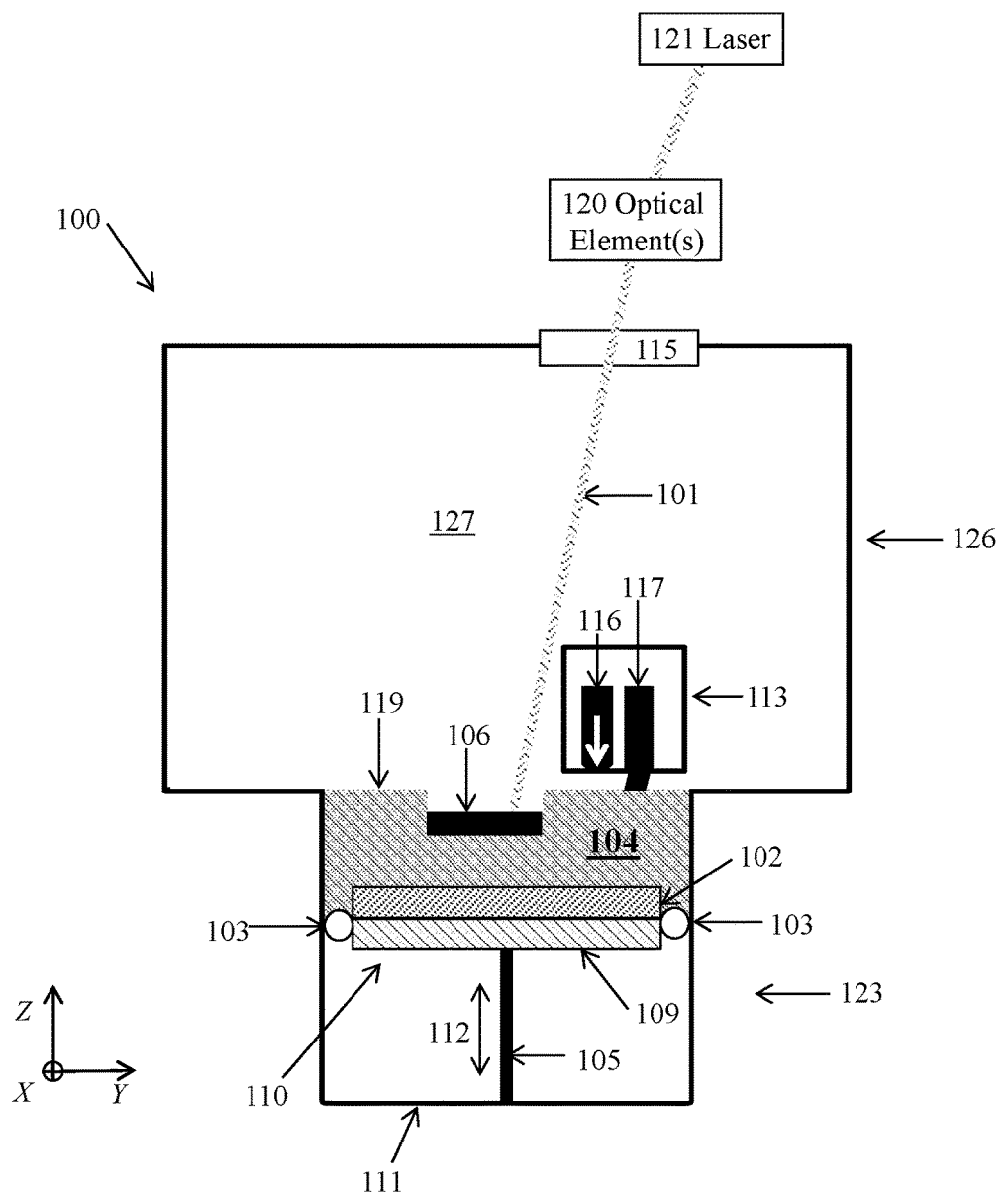
FIG. 1 schematically illustrates a section view of a portion of a three-dimensional (3D) printer.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

The present disclosure provides apparatuses, systems and methods for controlling aspects of printing 3D objects (e.g., using a laser beam). In some embodiments, the apparatuses, systems and methods control an amount of debris generated within an enclosure as a byproduct of a printing process. Methods include controlling gas flow at least within a processing cone region where the laser beam may travel when scanning over a powder bed to melt the powder as part of the 3D printing process. In some cases, the methods involve controlling gas flow and debris concentration at least within particular portions of the processing cone region (e.g., within a processing chamber). In some cases, the methods involve controlling gas flow and a number of debris particles encountered by the energy beam (e.g. laser beam). The methods described herein can be used to print one or more 3D objects with low porosity and/or low surface roughness. In some embodiments, the printing systems are configured to print 3D object having a porosity at most about 1% by volume and/or a surface roughness (Ra) of at most about 50 micrometers.

The term "operatively coupled" or "operatively connected" refers to a first mechanism that is coupled (or connected) to a second mechanism to allow the intended operation of the second and/or first mechanism. The term "configured to" refers to an object or apparatus that is (e.g., structurally) configured to bring about a result.

Terms such as "a," "an" and "the" are not intended to refer to only a singular entity, but include the general class of which a specific example may be used for illustration. The terminology herein is used to describe specific embodiments, but their usage does not limit the specified embodiments.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The present disclosure provides three-dimensional (3D) printing apparatuses, systems, software, and methods for forming 3D objects. A powder, as understood herein, is a granular material before it has been melted using a printing operation (also referred to as "printing"). During printing can referred to as the time frame in which a laser beam is impinging on the powder material and transforming (e.g., melting) the powder material to a molten state. In some embodiments, the size of the particles of the powder range from about 10 micrometers (μm) to about 50 μm in diameter. The printing can include sequentially melting multiple sequentially deposited layers of powder respectively, where one layer of melted (molten) material fuses with an adjacent layer to form at least a portion of a 3D object. Some of the printing techniques described herein are in accordance with selective laser melting (SLM), selective heat sintering (SHS), or selective laser sintering (SLS) techniques. The powder can be made of any suitable material. The powder may comprise an elemental metal or metal alloy. In some embodiments, the material comprises a metal, such as steel (e.g., stainless steel), aluminum, aluminum alloys, nickel, nickel alloys (e.g., Inconel), titanium and/or titanium alloys.

The 3D printing system (also referred to herein as "printer" or "printer system") may include an enclosure. FIG. 1 shows a cross-section side view of an example 3D printer having an enclosure 100, which includes a processing chamber 126 and a build module 123 that is configured to accommodate the powder bed 104. The processing chamber has walls that define an internal volume 127. The internal volume of the processing chamber can accommodate a laser beam 101 generated by a laser 121. In some cases, the laser beam is directed through a window 115 that is coupled to a wall of the processing chamber. In some embodiments, the window is coupled to a ceiling (e.g., top wall) of the processing chamber. The laser beam is directed at a surface 119 of the powder bed to melt at least a portion of the powder. The impinged-on portion of the powder bed cools to a hardened material, 106 as part of the 3D object.

The internal volume of the processing chamber is configured to maintain an atmosphere while the melting process occurs. For example, the walls of the processing chamber can at least partially isolate the internal atmosphere from an external environment (e.g., ambient environment). In some cases, the external environment is the environment of a room in which the printer is located. In some cases, the processing chamber is further enclosed within another environment different than the external environment. For example, the processing chamber, build module and/or additional chambers (e.g., unpacking station) may be enclosed within a larger enclosure that has its own internal environment. In some embodiments, the atmosphere within the processing chamber includes one or more inert gases, such as argon and/or nitrogen. In some cases, the walls of the processing chamber may function to protect users of the printer from contents of the atmosphere, laser beam, and/or the powder from users of the printer. For example, the walls may provide protection against the laser beam or combustible material.

The laser can be any suitable type of laser, such as a fiber laser, a solid-state laser or a diode laser. In some embodiments, the laser is configured to generate an optical power output (laser power) ranging from about 100 Watts to about 1,000 Watts. In some embodiments, the laser may be configured to generate a laser beam having a power density on the powder bed ranging from about 100 kilowatts per centimeter squared ($kW/cm^2$) to about 30,000 $kW/cm^2$. In some embodiments, the laser is configured to generate a laser beam having peak wavelength range of about 800 nm to about 1,500 nm. In some embodiments, the laser is configured to generate a laser beam having a spot size on the powder bed having a diameter ranging from about 50 micrometers (μm) to about 500 μm.

Characteristics and/or movement of the laser beam can be modified by one or more optical elements 120, which may be situated inside or outside of the enclosure and/or processing chamber. In some embodiments, the optical elements and/or the laser are enclosed within a separate chamber (e.g., external (e.g., adjacent) to the processing chamber and part of the enclosure of the printer). The optical elements can include one or more scanners (e.g., galvanometer scanners), polygons, mechanical stages (e.g., X-Y stages), piezoelectric devices, gimbles, mirror, lenses, windows, beam splitters, and/or prisms. The scanners can be configured to direct (e.g., by deflection) the laser beam across the surface of the powder bed in accordance with a (e.g., predetermined) path. In some embodiments, the scanners are configured to provide scan speeds up to about 5 meters per second (m/s). The path can include one or more hatches, and can be in accordance with a stripe pattern, island pattern and/or chessboard pattern. The laser beam scanning may unidirectional, bidirectional, spiral and/or double scan.

The enclosure may include one or more build modules 123. A build module can be removably coupled with the processing chamber or be integrally coupled to the processing chamber. The build module can include an internal volume configured to enclose at least a portion of a platform 110 (also referred to herein as a "build platform"), which is configured to support the powder bed. In some cases, the platform includes a base 102 and/or a substrate 109. In some embodiments, the surface of the platform that supports the powder bed has an area ranging from about 100 square centimeters ($cm^2$) to about 10,000 $cm^2$. The internal volume of the build module can be configured to enclose at least a portion of an elevator 105 that is configured to move (e.g., vertically translate) the platform. In some embodiments, the platform is configured to translate in vertical steps ranging from about 20 micrometers (μm) to about 500 μm. In some embodiments, the platform is configured to support a powder bed having a height (e.g., in Z direction of FIG. 1) ranging from about 100 millimeters (mm) to about 1,000 mm. In some embodiments, one or more seals 103 enclose the powder in a selected area within the build chamber (e.g., away from the elevator). The elevator may comprise an actuator (e.g., a motor).

The build module may be removably engageable with the processing chamber. For example, the build module may be engaged with the processing chamber during a printing operation to at least partial isolate the internal volume of processing chamber from the external atmosphere. After the printing operation, the build module can be disengaged from the processing chamber. In some cases, the disengagement opens the internal volume of the processing chamber and/or the build module to the external atmosphere. In some embodiments, the build module and/or the processing chamber includes a shutter that isolates the atmosphere within the build module and/or the processing chamber upon disengagement.

Figure 2:
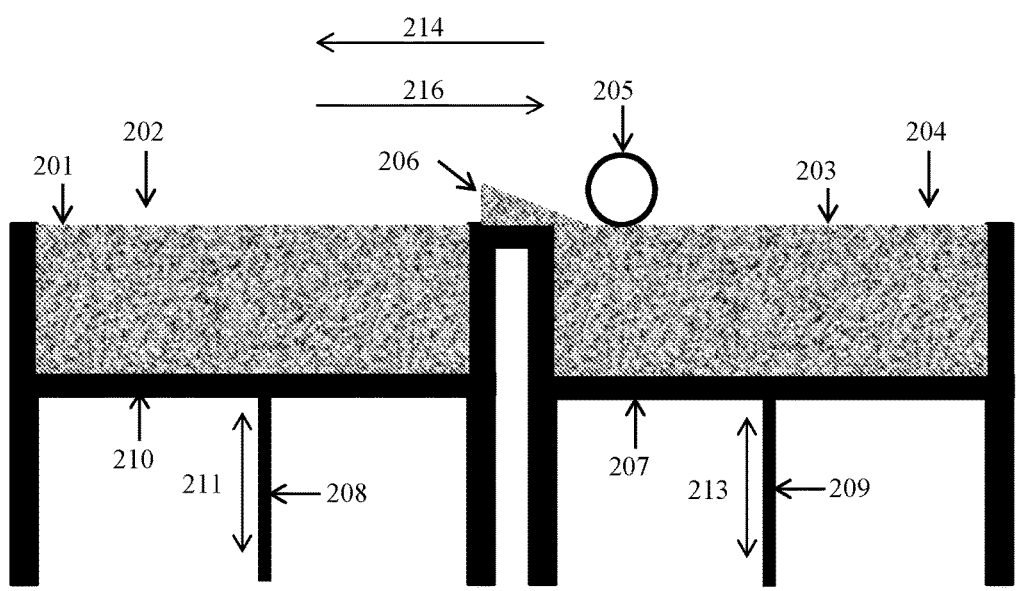
FIG. 2 schematically illustrates a section view of a portion of a 3D printer.

The 3D printer may include a layer forming devices 113 (also referred to herein as a "layer dispenser"). The layer forming device may include a powder dispenser 116 and/or a leveler 117. The leveler can include a blade or roller that contacts the powder bed a provide a level (e.g., planar) surface for the powder bed. In some embodiments, the 3D printer includes a container for holding a supply of powder (e.g., a reservoir). FIG. 2 shows a side view of an example container 204 adjacent build module 202, which includes platform 210. The platform can be (e.g., vertically) translatable 211 by an elevator 208. In some cases, the layer forming device translates and pushes a portion 206 of the powder from the container to the region above the platform. The translation can be in a first direction 214 toward a region above the platform, and in a second direction 216 toward the container (e.g., to prepare for forming a subsequent layer). In some embodiments, a second elevator 209 of the container is translatable 213 so as to translate the supply of powder (e.g., upward). The translating of the layer dispenser can be in directions (e.g., substantially) perpendicular to a translation direction 211 of the platform and/or a translation direction 213 of the support member 207 of the container. In some embodiments, the layer dispenser is configured to provide a layer of powder having a thickness ranging from about 20 micrometers (μm) to about 500 μm.

Figure 5:
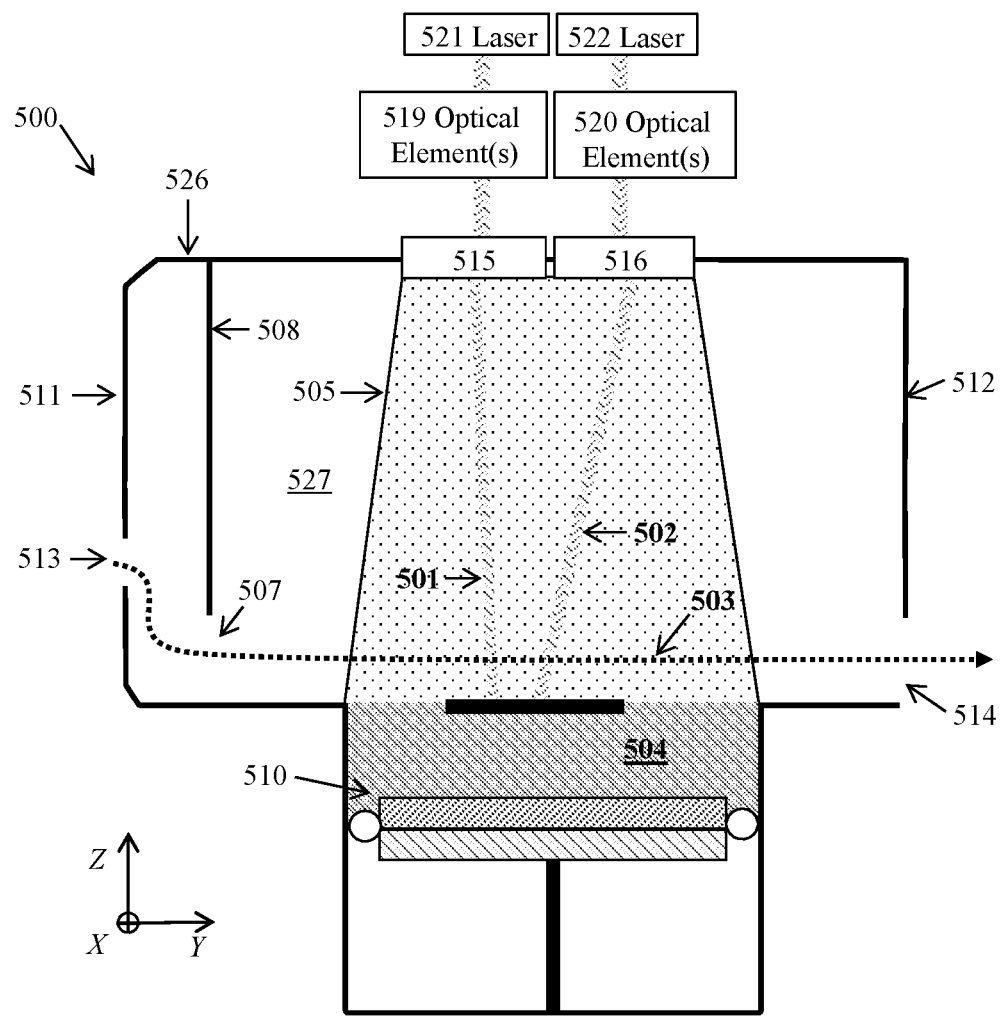
FIG. 5 schematically illustrates a section view of a portion of a 3D printer.

In some cases, the printer includes more than one laser. For example, the printer can have two, three, four, five, or more lasers. FIG. 5 shows a section view of a portion of an example printer having two lasers 521 and 522, optical elements 519 and 520 and windows 515 and 516 for directing laser beams 501 and 502 toward the powder bed 504. In some applications, at least two of the lasers are used simultaneously or sequentially (e.g., one at a time). In some applications, multiple laser beams (e.g., 2, 3, 4, or 5) are used in parallel. In some cases, at least two laser beams are scanned at different rates, and/or along different paths. For example, the movement of a first laser beam may be faster than the movement of a second laser beam. In some cases, at least two laser beams are scanned at (e.g., substantially) the same rates, and/or along (e.g., substantially) the same paths.

Figure 3:
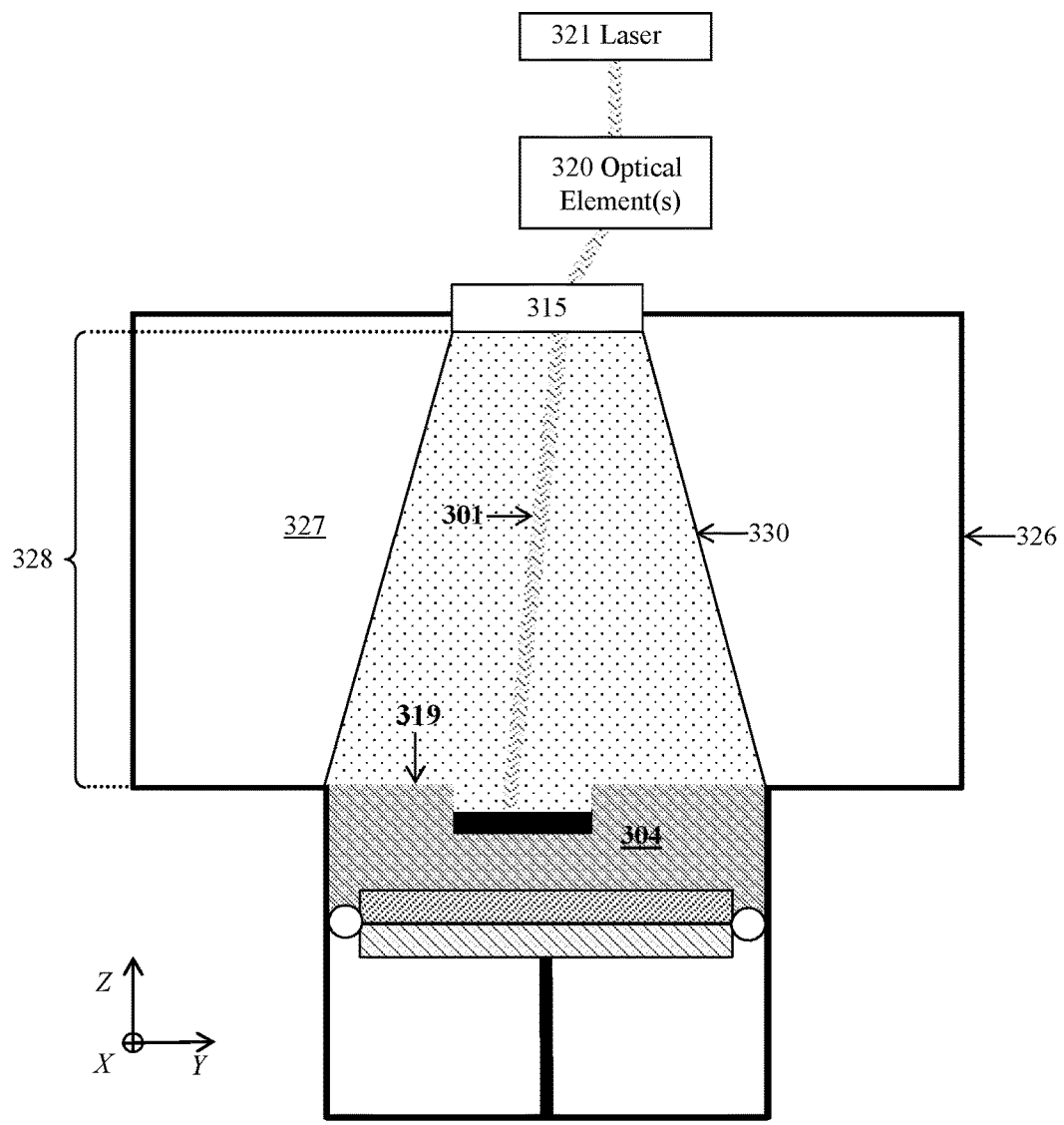
FIG. 3 schematically illustrates a section view of a portion of a 3D printer.

The laser beam(s) may travel through a region of the processing chamber referred to as a processing cone region (also referred the herein as a "processing cone"). FIG. 3 shows a cross section view of an example printer having a laser 321 that is configured to direct a laser beam 301 through a window 315 and an internal volume 327 of a processing chamber 326, towards an exposed surface 319 of a powder bed 304. One or more optical elements 320, which may include one or more scanners, can be configured to move the laser beam (e.g., by deflection) in accordance with a predetermined path along the target surface (e.g., surface of a powder bed 304). Movement of the laser beam(s) during a printing operation can causes the laser beam(s) to potentially occupy a volume within between the area or point of entry of the laser beam into the processing chamber (e.g., the interior surface of the window 315) and the area of the surface of the powder bed—referred to as the processing cone region 330. If multiple laser beams are used during a printing operation, the processing cone region includes the volume between the areas or points of entry of the multiple laser beams (e.g., interior surfaces of the windows) and the area of the surface of the powder bed. The height 328 of processing cone region can span a distance between the interior surface of the window 315 and the surface 319 of the powder bed. In some embodiments, the processing cone region has a height 328 ranging between about 10 centimeters (cm) and about 100 cm. In some cases, the processing cone region includes at least a portion of the powder bed. The shape of the processing cone region may vary. In some embodiments, the shape of the processing cone region is a cone, a pyramid (e.g., square pyramid), a frustum (cut-off pyramid), a cylinder, a tetrahedron, a cube or a prism (e.g., triangular prism, hexagonal prism or pentagonal prism). In some embodiments, the processing cone region has a symmetric shape (e.g., substantially symmetric about a central axis). In some embodiments, the processing cone region has a non-symmetric shape. The processing cone may have a shape depending on the motion range of the laser(s), that may depend on the shape of the platform. In addition, the laser beam 301 itself can define a volume within the processing chamber (and within the processing cone)—referred to herein as the laser beam volume. A laser beam volume can be defined as the volume encompassed by the laser beam along height 328 between the interior surface of the window 315 and the surface 319 of the powder bed.

Figure 4A:
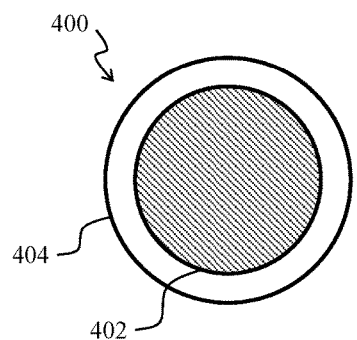
FIGS. 4A and 4B schematically illustrate section views of debris particles.
Figure 4B:
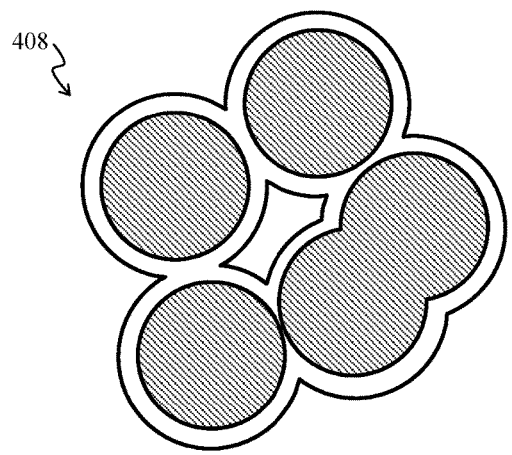

In some embodiments, melting of the powder creates debris as a byproduct. The debris may travel into the atmosphere within the processing chamber (e.g., during processing). The debris may also referred to as "gas-borne" debris. In some cases, the debris is continuously generated and expelled into the internal volume of the processing chamber during the printing. In some cases, the gas-borne debris exits the surface of the powder bed as a plume of gas-borne debris. The gas-borne debris can include particles that are melted, sintered, or partially melted or sintered. The gas-borne debris may include powder that was not transformed. The gas-borne debris can include particles of partially or fully oxidized metal (e.g., metal oxide) (also referred to herein as "soot"). The gas-borne debris may include un-melted or un-oxidized powder particles that leave the powder bed (e.g., into the atmosphere within the processing chamber). In some cases, the gas-borne debris includes particles having diameters ranging from about 0.1 micrometers (μm) to about 1 μm. The debris may comprise smaller particles (e.g., in the nanometer range). FIG. 4A shows a section view of an example soot particle 400. In some cases, the soot particles include about 70% to about 95% metal 402 (e.g., core) and about 5% to about 30% metal oxide 404 (e.g., outer shell) by volume. In some cases, the soot particles include at least about 10% metal oxide by volume. In some cases, the soot particles fuse together in clusters. FIG. 4B shows a section view of an example of a cluster of soot particles 408.

The rate of gas-borne debris production within the processing chamber can depend, in part, on the rate of melting of the powder. Melting may comprise fully melting or partially melting. Sintering may comprise partially melting. In some applications, the rate of melting is at least about 1 cubic centimeters per hour ($cm^3$/hr), 2 $cm^3$/hr, 3 $cm^3$/hr, 4 $cm^3$/hr, 5 $cm^3$/hr, 10 $cm^3$/hr, 20 $cm^3$/hr, 30 $cm^3$/hr, 40 $cm^3$/hr, 50 $cm^3$/hr, 100 $cm^3$/hr, 150 $cm^3$/hr, 200 $cm^3$/hr, 250 $cm^3$/hr, 300 $cm^3$/hr, 400 $cm^3$/hr or 500 $cm^3$/hr per laser during a printing operation. The rate of melting may range between any of the afore-mentioned values (e.g., from about 1 $cm^3$/hr to about 500 $cm^3$/hr, from about 5 $cm^3$/hr to about 100 $cm^3$/hr, from about 100 $cm^3$/hr to about 500 $cm^3$/hr, or from about 1 $cm^3$/hr to about 50 $cm^3$/hr) during a printing operation. In some embodiments, the rate of gas-borne debris production is at least about 10 micrograms per second (μg/sec), 50 μg/sec, 100 μg/sec, 200 μg/sec, 300 μg/sec, 400 μg/sec, 500 μg/sec or 1 milligram (mg/sec) during a printing operation. In some embodiments, the rate of gas-borne debris production is at most about 50 μg/sec, 100 μg/sec, 200 μg/sec, 300 μg/sec, 400 μg/sec, 500 μg/sec, 1 mg/sec, or 5 mg/sec during a printing operation. The rate of gas-borne debris production may range between any of the afore-mentioned values (e.g., from about 10 μg/sec to about 5 mg/sec, from about 300 μg/sec to about 5 mg/sec, from about 10 μg/sec to about 300 μg/sec, or from about 10 μg/sec to about 100 μg/sec) during a printing operation.

Sometimes, the gas-borne debris within the processing cone can interfere with the effectiveness of the laser beam(s). For example, the gas-borne debris may absorb, reflect and/or diffract some of energy of the laser beam so that its intensity, spot size and focus is affected by the time the laser beam reaches the powder bed. This can cause inconsistencies in the intensity, focusing, and/or spot size of the laser beam during the printing operation, which can in turn manifest as and/or contribute to inconsistencies in the 3D object. In some cases, the inconsistencies include density inconsistencies (e.g., porosity) and/or surface roughness on the 3D object surface(s).

The printing system can include features to address or compensate for the gas-borne debris within at least the processing cone region. In some embodiments, the laser(s) can be configured to adjust various aspects of the laser beam (e.g., comprising intensity, cross-section, or speed) in conjunction with the debris concentration at least the processing cone region (e.g., within the processing chamber). For example, the various aspects of the laser beam may be adjusted during the printing operation (e.g., in real time). The adjustments may be made using one or more controllers. The controller may comprise a feedback or feedforward control scheme. The controller may comprise a closed loop or open loop control scheme. One or more sensors (e.g., within or outside of the processing chamber) may provide feedback to the one or more controllers when the debris concentration reaches a threshold value. The one or more controllers can then cause the laser(s) to adjust one or more of the various aspects of the laser beam(s) accordingly (e.g., such as increase or decrease the intensity of the laser beam(s)). In some cases, the one or more controllers are configured to cause the one or more optical elements to adjust the depth of field (i.e., effective focus range) of the laser beam(s) based on input from the one or more sensors.

In some embodiments, the gas-borne debris within the processing cone region is reduced by allowing a gas (e.g., an inert gas, or an external atmosphere) to enter the internal volume of the processing chamber. The gas can displace (purge) at least some of the gas-borne debris, thereby reducing its concentration in the processing cone region. In some embodiments, the purging gas enters the processing chamber when the build module is separated from the processing chamber. The purging gas may be allowed to enter during or after a printing operation (e.g., between builds). The external atmosphere may be allowed to enter during or after a printing operation (e.g., between builds).

In some cases, the printer includes a gas flow system that introduces a flow of gas that moves the gas-borne debris within at least the processing cone (e.g., within the processing chamber) during a printing operation. FIG. 5 shows a section view of a portion of an example printer having an enclosure 500 that includes a gas flow system. The gas flow system can include an inlet region 511, which includes one or more inlet ports 513 that is/are operationally coupled with a gas source. The gas source may provide an inert gas, such as nitrogen and/or argon. The inert gas may be (e.g., substantially) non-reactive (e.g., non-chemically reactive) with the powder during a printing operation. In some embodiments, the inlet region includes a wall 508 that separates the inlet region from the internal volume 527 of the processing chamber 526. The gas can enter the inlet region at the one or more inlet ports and exit the inlet region via one or more inlet openings 507. In some embodiments, the one or more inlet ports correspond to the one or more inlet openings (e.g., no wall 508). The inlet region can include any suitable number of inlet ports and/or inlet openings (e.g., 1, 2, 3, 4, 5, 6, 7, 8, 9, or 10). In some embodiments, the inlet ports and/or inlet openings correspond to openings within a perforated plate, a screen, a mesh and/or a gas permeable material.

The gas flow system can include an outlet region 512, which includes one or more outlet openings 514 for the flow of gas to exit the processing chamber. In some cases, the gas may flow through the processing chamber toward the outlet openings due to a pressure difference between the inlet and outlet regions. In some cases, the one or more outlet openings (e.g., fluidly) coupled one or more pumps that assist movement of the gas through the processing chamber. The pump(s) may include a positive displacement pump (e.g., rotary) and/or a vacuum pump (e.g., Venturi). The one or more outlet openings can be operationally coupled with a gas recycling system that recycles the gas back through the one or more inlet ports (e.g., after filtering out debris). The outlet region can include any suitable number of outlet openings (e.g., 1, 2, 3, 4, 5, 6, 7, 8, 9, or 10). In some embodiments, the one or more outlet openings correspond to openings within a perforated plate, a screen, a mesh and/or a gas permeable material. The inlet and outlet regions can be coupled to any wall of the processing chamber. For example, the inlet and/or outlet regions may be coupled to side walls, a ceiling (e.g., adjacent to the windows 515 and 516), and/or a floor (e.g., adjacent to the platform 510) of the processing chamber.

In some embodiments, the inlet port(s), inlet opening(s), and/or outlet opening(s) are operationally coupled to one or more valves and/or nozzles. The valve(s) and/or nozzle(s) can control an amount (e.g., on or off) and/or a velocity of the flow of gas into the processing. The valve(s) and/or nozzle(s) may be controlled manually or automatically (e.g., using one or more controllers). The nozzle(s) may include jet (e.g., gas jet) nozzle, high velocity nozzle, propelling nozzle, magnetic nozzle, spray nozzle, vacuum nozzle, Venturi nozzle, or shaping nozzle (e.g., a die). The nozzle can be a convergent or a divergent nozzle. The spray nozzle may comprise an atomizer nozzle, an air-aspirating nozzle, or a swirl nozzle.

According to some embodiments, the inlet and outlet regions are positioned so as to provide a flow of gas 503 through at least a portion of the processing cone 505. The debris being generated at the surface of the processing cone can become entrained with the flow of gas and exit the processing chamber via the outlet region. In some cases, the inlet region is along one side wall of the processing chamber, and the outlet region is along an opposing side wall of the processing chamber. In this way, the flow of gas can travel along the surface of the powder bed across a width or length of the processing chamber. In some cases, the inlet region is along a ceiling (e.g., top wall) of the processing chamber (e.g., adjacent to window 515 or 516) and the outlet region is along one or more side walls of the processing chamber. In this way, a first portion of the flow of gas can travel toward the powder bed and a second portion of the flow of gas can travel along the surface of the powder bed. At least a portion of the flow of gas can be (e.g., substantially) parallel to the surface of powder bed. A substantially parallel flow of gas can be in a direction that is about 0 degrees (°), 1°, 5°, 10°, 20°, 30° or 40° relative to the exposed surface of the powder bed and/or the platform. In some embodiments, at least a portion of the flow of gas is (e.g., substantially) laminar to reduce turbulence near the powder bed, for example, just above the exposed surface and/or within the processing cone.

Figure 6:
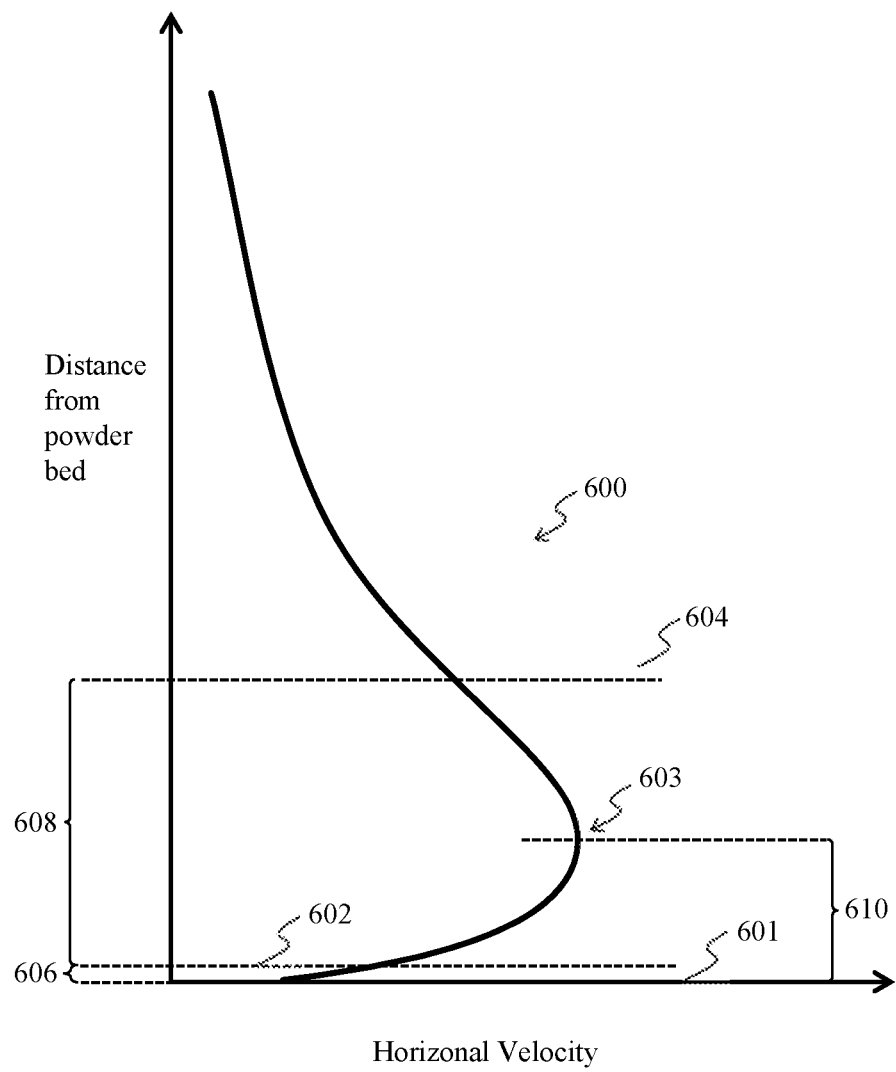
FIG. 6 illustrates a graph indicating gas flow parameters.

In some embodiments, at least a portion of the flow of gas is in a (e.g., substantially) horizontal direction. A substantially horizontal flow of gas can be in a direction that is about 60°, 70°, 80°, 85°, 89° or 90° with respect to a gravity vector. FIG. 6 shows a profile 600 indicating horizontal (e.g., lateral) gas flow velocity within a processing chamber as a function of distance from a surface 601 of the powder bed, in accordance with some embodiments. The horizontal gas flow can have a peak velocity 603 at a peak velocity height 610 in relation to the exposed surface 601 of the powder bed. The peak velocity height 610 can vary depending on a number of factors including the heights of the inlet and outlet openings and/or the lateral distance along the length of the powder bed and/or the platform. The peak velocity height 610 can be within a powder bed proximity zone 608.

The powder bed proximity zone corresponds to a section of the processing chamber and/or the processing cone region between a height 602 of a boundary layer and a prescribed distance 604 from the surface of the powder bed. In some embodiments, the peak velocity height 610 is (e.g., substantially) equidistant (e.g., midway) between the height 602 of a boundary layer and the prescribed distance 604. The boundary layer 606 refers to a region immediately above the surface of the powder bed where effects of viscosity may be significant and horizontal velocity across the powder bed may be relatively low. In some embodiments, the height 602 of the boundary layer is at most about 1 mm, 2 mm, 3 mm, 4 mm, 5 mm, 6 mm, 7 mm, 8 mm, or 9 mm, 10 mm from the surface of the powder bed.

The prescribed distance 604 and the height 608 of the powder bed proximity zone may vary in accordance with the peak velocity height 610. In some embodiments, the prescribed distance 604 is at least about 5 mm, 6 mm, 7 mm, 8 mm, 9 mm, 10 mm, 12 mm, 15 mm, 20 mm, 25 mm, 30 mm, 40 mm, 50 mm, 60 mm, 70 mm, 80 mm, 90 mm, 100 mm, 120 mm, 150 mm or 200 mm from the exposed surface of the powder bed and/or platform. The powder bed proximity zone 608 can range between any of the afore-mentioned values of boundary layer height and prescribed distance (e.g., from about 1 mm to about 200 mm, from about 1 mm to about 30 mm, from about 30 mm to about 200 mm, from about 15 mm to about 50 mm, or from about 15 mm and about 100 mm) above the surface of the powder bed and/or platform.

In some cases, the flow of gas is continuously provided during a printing operation. In some cases, the flow of gas is provided during only a portion of the printing operation. In some cases, the velocity of the flow of gas remains (e.g., substantially) the same during the printing operation, or during a portion of the printing operation (e.g., during laser irradiation for melting). In some cases, the velocity of the flow of gas is varied during the printing operation, or during a portion of the printing operation. One or more valves of the inlet port(s), inlet opening(s) and/or outlet opening(s) can be used to control the velocity and or amount (e.g., on/off) of the flow of gas. In some cases, the velocity (i.e., volumetric flow rate) of the flow of gas through the powder bed proximity zone is at least about 0.01 m/s, 0.05 m/s 0.1 m/s, 0.5 m/s, 1 m/s, 2 m/s, 3 m/s, 5 m/s, 10 m/s, 15 m/s, 20 m/s, 30 m/s or 50 m/s. The velocity of the gas flow through the powder bed proximity zone can be at most about 0.1 m/s, 0.2 m/s, 0.3 m/s, 0.5 m/s, 0.7 m/s, 0.8 m/s, 1 m/s, 2 m/s, 3 m/s, 5 m/s, 10 m/s, 15 m/s, 20 m/s, 30 m/s or 50 m/s. The velocity of the gas flow through the powder bed proximity zone can be between any of the afore-mentioned values (e.g., from about 0.01 m/s to about 50 m/s, from about 0.01 m/s to about 2 m/s, from about 2 m/s to about 50 m/s, or from about 0.2 m/s to about 2 m/s). The velocity can be measured using any suitable technique(s) and device(s). For example, one or more flow meters (e.g., anemometer, sonar flow meter, air flow meter or particle image velocimetry device or laser Doppler velocimetry device) may be used to measure the gas flow velocity across one or more prescribed distances above the surface of the powder bed. For example, a sensor used in an flow meter may measure gas flow velocity at a height within the powder bed proximity zone.

Figure 7:
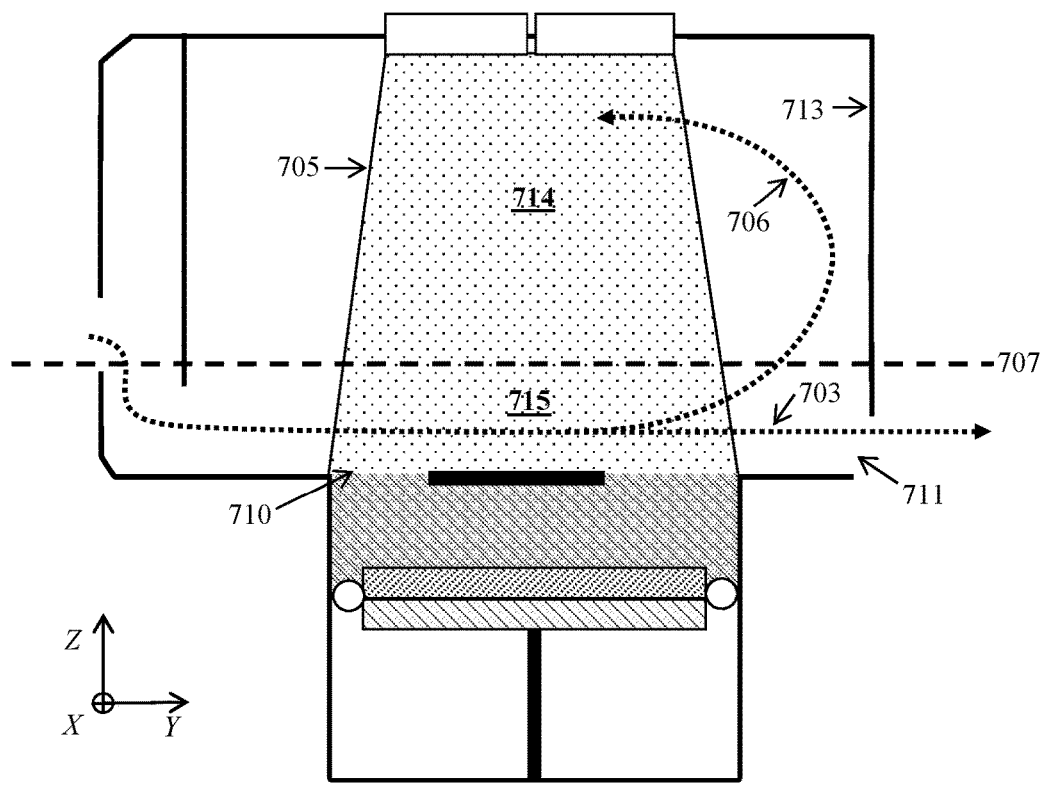
FIG. 7 schematically illustrates a section view of a portion of a 3D printer.

Although the flow of gas can reduce an overall debris concentration within the processing chamber, some of the gas flow may recirculate and redistribute some gas-borne debris within the processing chamber. FIG. 7 shows a section view of an example printer where a first portion 703 of the flow of gas exits the processing chamber via the outlet opening(s) 711, and a second portion 706 of the flow of gas recirculates back into the processing chamber. An internal shape of the processing chamber may be configured to facilitate the movement of the gas-borne debris. For example, a wall 713 (e.g., a side wall) of the processing chamber may facilitate movement of the second portion 706 of the flow of gas back toward the processing cone 705. The recirculating flow of gas can be referred to as a backflow. In some embodiments, the recirculating flow is in accordance with a turbulent movement (e.g., within the processing cone region). The turbulent movement can include a cyclic movement and/or a standing vortex. The recirculation can be in a region 714 of the processing chamber (and the processing cone) above the powder bed proximity zone 715. For example, the region 714 can be a distance 707 that is at least about 5 mm, 6 mm, 7 mm, 8 mm, 9 mm, 10 mm, 12 mm, 15 mm, 20 mm, 25 mm, 30 mm, 40 mm, 50 mm or 60 mm above the surface of the powder bed.

The flow of gas can be used to maintain a concentration of debris within the processing chamber, processing cone (e.g., region 714) and/or the laser beam volume below a prescribed concentration or within a range of concentrations during the printing. For example, the region 714 above the powder bed and/or the laser beam volume may include gas-borne debris within a certain concentration. The concentration of debris may be measured based on weight per volume (e.g., milligrams per cubic meter) or debris particles per volume (e.g., particles per cubic centimeter or particles per laser beam volume). In some embodiments, the flow of gas is used to maintain a debris concentration of at most about 1 milligrams per cubic meter ($mg/m^3$), 10 $mg/m^3$ 50 $mg/m^3$, 100 $mg/m^3$, 200 $mg/m^3$, 300 $mg/m^3$, 400 $mg/m^3$, 500 $mg/m^3$, 1,000 $mg/m^3$ or 5,000 $mg/m^3$ within the region 714 above the powder bed during printing. The flow of gas can maintain a debris concentration ranging between any of the aforementioned values (e.g., from about 1 $mg/m^3$ to about 5,000 $mg/m^3$, from about 300 $mg/m^3$ to about 5,000 $mg/m^3$, from about 10 $mg/m^3$ to about 300 $mg/m^3$, or from about 1 $mg/m^3$ to about 1,000 $mg/m^3$) within the region 714 above the powder bed during printing. In some embodiments, the flow of gas is used to maintain a concentration of debris particles having diameters of about 0.5 micrometers or greater of at most about 0.1, 0.5, 1, 50, 100, 200, 300, 400, 500, 1,000, 2,000, 3,000, 4,000 or 5,000 particles per cubic centimeter ($cm^3$) within the region 714 above the powder bed during printing. The flow of gas can maintain a concentration debris particles having diameters of about 0.5 micrometers or greater ranging between any of the aforementioned values (e.g., from about 0.1 to about 5,000 particles per $cm^3$, from about 0.1 to about 500 particles per $cm^3$, from about 500 to about 5,000 particles per $cm^3$, or from 0.5 to about 1,000 particles per $cm^3$) within the region 714 above the powder bed during printing. In some embodiments, the flow of gas is used to maintain a number of debris particles having diameters of about 0.5 micrometers or greater encountered by each laser beam (i.e., concentration within the laser beam volume) of at most about 1, 5, 10, 50, 100, 500, 1,000, 5,000, 10,000, 20,000 or 50,000 particles during printing. The flow of gas can maintain a number of debris particles having diameters of about 0.5 micrometers or greater encountered by each laser beam between any of the aforementioned values (e.g., from about 1 to about 50,000 particles, from about 1 to about 1,000 particles, from about 1,000 to about 50,000 particles, or from about 10 to about 10,000 particles) during printing.

During printing, the debris concentration within the powder bed proximity zone may fluctuate since gas-borne debris may continuously be formed and carried away by the flow of gas. Thus, at any given moment, the debris concentration within the powder bed proximity zone 715 may differ (e.g., be higher or lower) than the region 714 above the powder bed proximity zone.

In some embodiments, the maintained debris concentration range (e.g., at least above the powder bed proximity zone) may allow for printing of a 3D object having a porosity no greater than about 1% by volume and/or a surface roughness (Ra) no greater than about 50 micrometers. Porosity can refer to the volume of voids as a percentage of a total volume of the 3D object. Surface roughness (Ra) can correspond to the arithmetic average of the absolute values of the profile height deviations from the mean line, recorded within the evaluation length, in accordance with American Society of Mechanical Engineers (ASME) B46.1 standards. In some applications, the surface roughness is measured along a surface of the 3D object that is at a prescribed angle in relation to the exposed surface of the powder bed and/or the support surface of the platform. For example, in some applications, it may be challenging to form a smooth surface on a 3D object that is (e.g., substantially) normal to the exposed surface of the powder bed and/or the support surface of the platform during printing. This can be due to dynamics related to the melting process. In some embodiments, the surface roughness is measured along a surface of the 3D object that is at an angle ranging from about 85 degrees to about 120 degrees in relation to the powder bed and/or the support surface of the platform during the printing.

Figure 8:
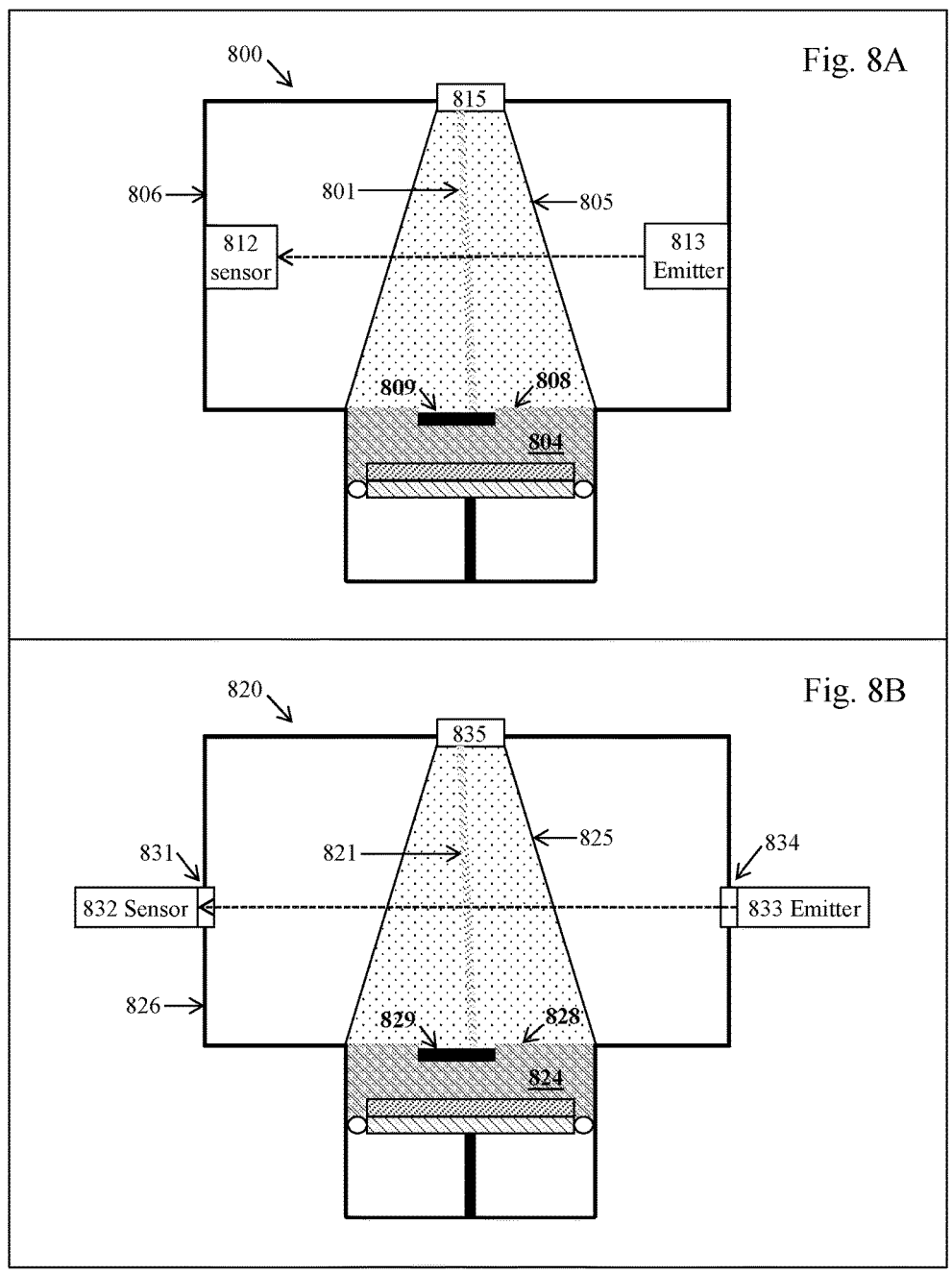
FIGS. 8A and 8B schematically illustrate section views of portions of 3D printers.

The debris concentration within the processing chamber (e.g., within and/or above the powder bed proximity zone of the processing cone region) can be measured using any suitable technique(s) and device(s). The debris concentration measuring devices may or may not be part of the printer. In some embodiments, the debris measuring device includes one or more emitters and/or one or more sensors (e.g., receivers). The emitter(s) may emit radiation, such as sound, charge and/or electromagnetic radiation (e.g., light (e.g., laser beam)). The sensor(s) can be configured to detect and/or receive the emitted radiation and/or changes in the emitted radiation. FIGS. 8A and 8B show section views of portions of example printer enclosures 800 and 820, respectively, with debris measuring devices. In FIG. 8A, an emitter 813 emits radiation through the processing chamber 806, including the processing cone region 805, and detected by a sensor 812, where the emitter and sensor are located inside the processing chamber. In FIG. 8B, an emitter 833 emits radiation through a first window 834, the processing cone region 805, a second window 831, and to a sensor 832, where the emitter and sensor are located outside the processing chamber 826. The first and second windows can be dedicated to the use of the emitter and sensor, or can be used for other purposes. The position of the receiver and emitter relative to the exposed surface of the powder bed may be adjustable. The emitter(s) and or sensor(s) can be configured to detect the debris concentration within a certain portion of the processing cone. For example, the emitter(s) and or sensor(s) can be located a height above the surface (e.g., FIG. 8A, 808 or FIG. 8B, 828) of the powder bed (FIG. 8A, 804 or FIG. 8B, 824) that is within the debris concentration zone of the processing cone. In some embodiments, the sensor(s) and/or emitter(s) are operatively coupled a particle counter (e.g., optical particle counter) that is used to determine the concentration of debris particles within the processing chamber, processing cone region and/or within the path of the laser beam (e.g., FIG. 8A, 801 or FIG. 8B, 821).

The particle counter can be configured to count debris particles above a prescribed diameter (e.g., above about 0.1 micrometer (µm), 0.5 µm, 1 µm or 5 µm). The particle count can be analyzed using any methodology (e.g., in accordance with U.S. Federal Standard 209E or ISO 14644-1 for cleanrooms). In some embodiments, a condensation particle counter, a differential mobility particle sizer, a scanning mobility particle sizer analyzer, a fast mobility particle sizer, an electric low pressure impactor and/or a tapered element oscillating analyzer, is used. In some cases, the debris concentration within laser beam(s) (e.g., laser beam(s)) is/are detected and analyzed using dark field analysis, where energy (e.g., light) that is unscattered by the debris particles is excluded from the image. In some cases, the debris concentration is determined using a thermal signal (e.g., black body radiation) of the laser beam(s) and/or emerging from the powder bed. In some embodiments, changes in the light intensity of certain portions of the laser beam, as reflected off a reflective surface (e.g., mirror or internal surface of the processing chamber wall (e.g., side wall)), are measured. In some embodiments, samples of the atmosphere within portions of the processing chamber are collected and analyzed (e.g., weighed) to calculate the concentration of debris (e.g., based on a calculated volume of gas through the processing chamber). In some embodiments, the gas-borne debris is collected in one or more filters operatively coupled to the processing chamber. The material collected in the filter can be analyzed (e.g., weighed) to calculate the concentration of debris (e.g., based on a calculated volume of gas through the processing chamber).

In some embodiments, the temperature of the flow of gas to the processing chamber and/or processing cone region may be controlled. For example, the gas may be heated and/or cooled before, or during the time it flows into the processing chamber and/or processing cone region. For example, the gas may flow through a heat exchanger and/or heat sink. The gas may be temperature controlled outside and/or inside the processing chamber. The gas may be temperature controlled at least one inlet to the processing chamber. In some embodiments, the temperature of the atmosphere in the processing chamber and/or processing cone region may be kept (e.g., substantially) constant. Substantially constant temperature may allow for a temperature fluctuation (e.g., error delta) of at most about 15 degrees Celsius (° C.), 12° C., 10° C., 5° C., 4° C., 3° C., 2° C., 1° C., or 0.5° C.

The 3D printers described herein can include one or more controllers that are operatively coupled with one or more components of the 3D printer, which one or more controllers direct(s) operation of the one or more components. In some cases, the controller(s) control the motion of one or more components. The one or more controllers can be part of a control system. The control system may be able to receive signals relating to the one or more components to be used (e.g., in feedback and/or closed loop control schemes). The operations can before, during and/or after a printing operation. For example, the controller(s) may direct the engagement and/or disengagement of the build module with the processing chamber. The controller(s) may direct transiting the build module to an unpacking station. The controller(s) may direct movement (e.g., vertical translation) of the platform. The controller(s) can direct the one or more lasers to generate the one or more laser beams (e.g., laser beams). The controller(s) may regulate the one or more aspects of the laser beams (e.g., wavelength range, laser power, power density, speed, dwell time, intermission time, focus, cross-section, pulsing frequency, or irradiating as a continuous beam). The controller(s) may control the position(s) of the one or more laser beams with respect to the platform (e.g., control the trajectory of the energy beam). For example, the controller(s) may control the optical element(s) (e.g., scanners). The controller(s) may control the operation of one or more valves of the printer (e.g., for controlling the flow of gas), such as by directing the valve(s) to open or close based on predetermined conditions. The controller(s) may control the velocity of the flow of gas within the processing chamber (e.g., via the valve(s) or nozzle(s)). The controller(s) may control the operation of one or more sensors of the printer (e.g., for sensing a pressure within the processing chamber), such as by directing the sensors to turn on or off based on predetermined conditions. The sensor may be position sensors to determine positions of one or more of the components (e.g., vertical position of the platform). The controller(s) may control the operation of the layer forming device (e.g., any of its components), such as by directing movement (e.g., translation) of the layer forming device. The controller(s) may control the operation of the one or more pumps, such as by directing the pump(s) to turn on or off based on predetermined conditions. The controller(s) may control locking and/or unlocking of doors and/or windows of the enclosure (e.g., processing chamber). The controller(s) may control aspects of software of the printer (e.g., printing directions). The controller may direct operations based on a control scheme (e.g., feedback and/or feedforward control). The control may direct operations based open loop control and/or closed loop control scheme.

The 3D printer can include any suitable number of controllers, and can be used to control any number of suitable (e.g., different) operations. For example, in some embodiments, one or more controllers is used to control one or more components and another one or more controllers is used to control another one or more components. In some embodiments, a number of controllers are used to control one component. In some embodiments, a controller (e.g., a single controller) used to control a number of components. For example, in some embodiments, one or more controllers is used to control the laser(s), and another one or more controllers is used to control aspects of the flow of gas (e.g., velocity).

Figure 9:
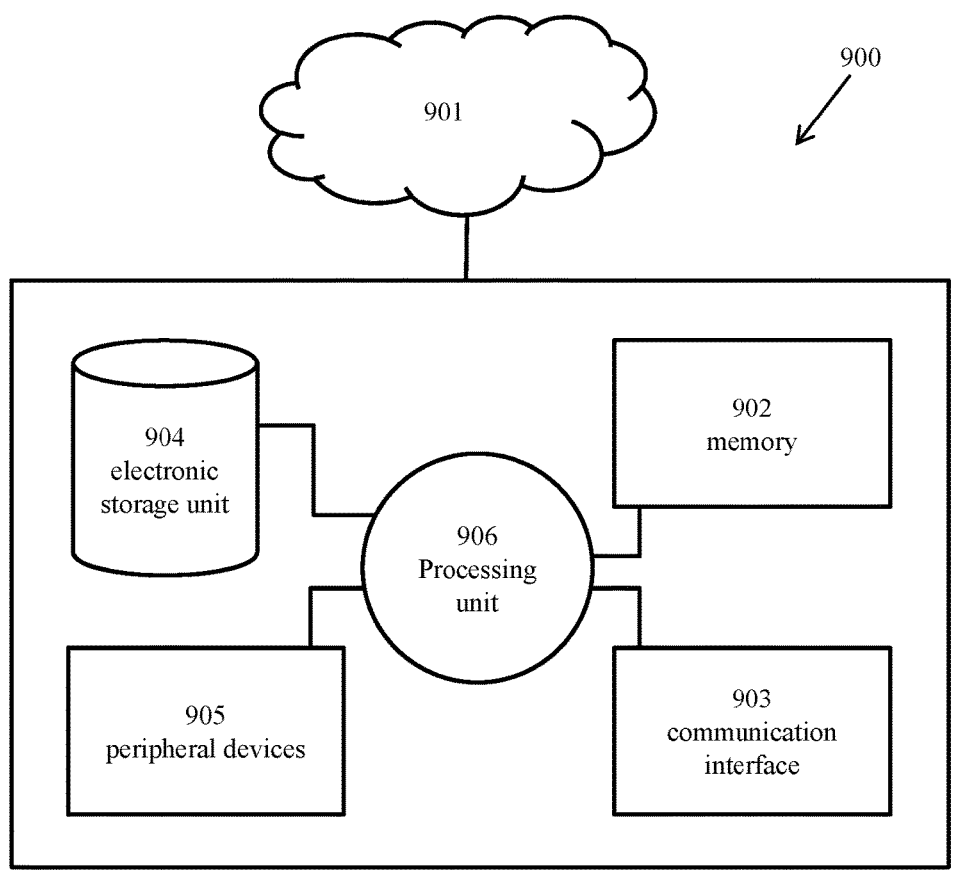
FIG. 9 schematically illustrates a computer system.

The printers described herein can include, or be in communication with, a computer system that may be operatively coupled to the one or more controllers. FIG. 9 schematically illustrates a computer system 900 in accordance with some embodiments. The computer system can include a processing unit (e.g., FIG. 9, 906) (also referred to herein as a "processor," "computer" or "computer processor"), a memory (e.g., FIG. 9, 902) (e.g., random-access memory, read-only memory, flash memory), an electronic storage unit (e.g., FIG. 9, 904) (e.g., hard disk), communication interface (e.g., FIG. 9, 903) (e.g., network adapter) for communicating with one or more other systems, and peripheral devices (e.g., FIG. 9, 905), such as cache, other memory, data storage and/or electronic display adapters. The memory storage unit interface, and peripheral devices can be in communication with the processing unit through a communication bus, such as a motherboard. The storage unit can be a data storage unit (or data repository) for storing data. The computer system can be operatively coupled to a computer network ("network") (e.g., FIG. 9, 901) with the aid of the communication interface. Instructions may be stored in the memory and can be directed to the processing unit, which can subsequently program or otherwise configure the processing unit to implement methods described herein. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet. The computer system can communicate with one or more remote computer systems through a network. For instance, the computer system can communicate with a remote computer system of a user (e.g., operator). Examples of remote computer systems include personal computers, tablet computers, telephones, smart phones, or personal digital assistants. Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the processor can execute the code. In some cases, the code can be retrieved from the storage unit and stored on the memory for ready access by the processor. In some situations, the electronic storage unit can be precluded, and machine-executable instructions are stored on the memory.

The printers described herein can include one or more power supplies to supply power to any of the components. The power can be supplied by a grid, generator, local, or any combination thereof. The power supply can be from renewable or non-renewable sources. The renewable sources may comprise solar, wind, hydroelectric, or biofuel. The power supply can comprise rechargeable batteries.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing a three-dimensional object, the apparatus comprising:
   a platform configured to support a powder bed comprising a powder material;
   a layer forming device configured to form at least one layer of the powder material, wherein the layer forming device includes a blade or a roller configured to translate in a first direction over a surface of the powder bed to planarize the surface of the powder bed;
   an elevator operationally coupled with the platform, wherein the elevator comprises a motor configured to translate the platform in a second direction substantially perpendicular to the first direction;
   a processing chamber having one or more walls enclosing an internal volume, which one or more walls is configured to enclose the surface of the powder bed during printing, wherein the processing chamber includes a ceiling wall;
   one or more lasers configured to generate one or more laser beams that (i) melts at least a portion of the powder bed to a molten material as part of the three-dimensional object during the printing, and (ii) forms gas-borne debris within the internal volume;
   one or more windows coupled to the ceiling wall, wherein the one or more windows is configured to transmit the one or more laser beams to the internal volume;
   one or more galvanometer scanners configured to move the one or more laser beams within a processing region of the internal volume of the processing chamber, wherein the one or more galvanometer scanners is external to the internal volume of the processing chamber;
   a gas flow system comprising one or more openings disposed in the one or more walls, which gas flow system is operationally coupled with the processing chamber and configured to provide a flow of gas across at least a portion of the processing region, wherein during the printing the flow of gas maintains a debris concentration of about 1 milligrams per cubic meter to about 1,000 milligrams per cubic meter (a) in the processing region and (b) at least about 20 millimeters above the surface of the powder bed, wherein the printing results in the three-dimensional object having a porosity of about 1% or less by volume, wherein the gas flow system is configured to facilitate movement of the gas-borne debris at least in the processing region during the printing, wherein the gas flow system is configured to facilitate the movement of the gas-borne debris corresponding to a turbulent movement at least in the processing region; and
   one or more controllers comprising electrical circuitry operationally coupled with the elevator, the layer forming device, the one or more galvanometer scanners, and the gas flow system, which one or more controllers are configured to direct (I) the elevator to translate the platform in the second direction, (II) the layer forming device to translate in the first direction, (III) the one or more galvanometer scanners to direct the one or more laser beams at the powder bed along at least one trajectory, and (IV) the gas flow system to provide the flow of gas.

2. The apparatus of claim 1, wherein the processing region has a shape that is configured to encompass (i) a motion range of the one or more laser beams that move along the at least one trajectory, and (ii) at least a portion of the surface of the powder bed.

3. The apparatus of claim 1, wherein the turbulent movement comprises a cyclic movement.

4. The apparatus of claim 1, wherein the turbulent movement comprises a backflow or a standing vortex.

5. The apparatus of claim 1, wherein at least one valve of the gas flow system is configured to facilitate the movement of the gas-borne debris.

6. The apparatus of claim 1, wherein an internal shape of the processing chamber is configured to facilitate the movement of the gas-borne debris.

7. The apparatus of claim 1, wherein at least one wall of the one or more walls is configured to facilitate the movement of the gas-borne debris.

8. The apparatus of claim 7, wherein the wall of the processing chamber is a side wall.

9. The apparatus of claim 1, wherein the flow of gas has a peak horizontal velocity height that varies along a length of the powder bed and/or the platform.

10. An apparatus for printing a three-dimensional object, the apparatus comprising:
    a platform configured to support a powder bed comprising a powder material;
    a layer forming device configured to form at least one layer of the powder material, wherein the layer forming device includes a blade or a roller configured to translate in a first direction over a surface of the powder bed to planarize the surface of the powder bed;
    an elevator operationally coupled with the platform, wherein the elevator comprises a motor configured to translate the platform in a second direction substantially perpendicular to the first direction;
    a processing chamber having one or more walls enclosing an internal volume, which one or more walls are configured to enclose the surface of the powder bed during the printing, wherein the processing chamber includes a ceiling wall;
    one or more lasers configured to generate one or more laser beams that (i) melts at least a portion of the powder bed to a molten material as part of the three-dimensional object during the printing, and (ii) forms gas-borne debris within the internal volume;
    one or more windows coupled to the ceiling wall, wherein the one or more windows is configured to transmit the one or more laser beams to the internal volume;
    one or more galvanometer scanners configured to move the one or more laser beams within a processing region of the internal volume of the processing chamber, wherein the one or more galvanometer scanners is external to the internal volume of the processing chamber;
    a gas flow system comprising one or more openings disposed in the one or more walls, which gas flow system is operationally coupled with the processing chamber and configured to provide a flow of gas across at least a portion of the processing region, wherein during the printing, the flow of gas maintains a debris concentration of 0.5 particles per cubic centimeter to 1,000 particles per cubic centimeter (a) in the processing region and (b) at least 20 millimeters above the surface of the powder bed, each of which particles has a diameter of 0.5 micrometer or greater, wherein the printing results in the three-dimensional object having a porosity of 1% or less by volume; and
    one or more controllers comprising electrical circuitry operationally coupled with the elevator, the layer forming device, the one or more galvanometer scanners, and the gas flow system, which one or more controllers are configured to direct (I) the elevator to translate the platform in the second direction, (II) the layer forming device to translate in the first direction, (III) the one or more galvanometer scanners to direct the one or more laser beams at the powder bed along at least one trajectory, and (IV) the gas flow system to provide the flow of gas.

11. The apparatus of claim 10, wherein the debris concentration within the at least the portion of the processing region varies during the printing.

12. The apparatus of claim 10, wherein the gas-borne debris within the internal volume is formed during melting of the at least the portion of the powder bed to the molten material as part of the three-dimensional object.

13. The apparatus of claim 10, wherein the debris concentration is present at a height of at least 30 millimeters above the surface of the powder bed.

14. The apparatus of claim 10, wherein the debris concentration is present at a height of at least 50 millimeters above the surface of the powder bed.

15. The apparatus of claim 10, wherein the gas flow system is configured to provide at least a portion of the flow of gas in a direction that is substantially parallel to the surface of the powder bed and/or the platform.

16. The apparatus of claim 15, wherein the flow of gas has a peak horizontal velocity ranging from 0.2 meters per second to 2 meters per second (m/s).

17. The apparatus of claim 10, wherein the flow of gas has a peak horizontal velocity within a height of 15 millimeters and 100 millimeters (mm) above the surface of the powder bed and/or the platform.

18. The apparatus of claim 10, wherein each of the one or more lasers is configured to generate a laser beam having a power density ranging from 100 Kilo Watts per centimeter squared to 30,000 Kilo Watts per centimeter squared (KW/cm$^2$), as measured at the surface of the powder bed.

19. The apparatus of claim 10, further comprising an optical system configured to modify at least one characteristic of the one or more laser beams, wherein the optical system is configured to generate a focused or a defocused laser beam at the surface of the powder bed.

20. An apparatus for printing a three-dimensional object, the apparatus comprising:
a platform configured to support a powder bed comprising a powder material;
a layer forming device configured to form at least one layer of the powder material as part of the powder bed, wherein the layer forming device includes a blade or a roller configured to translate in a first direction over a surface of the powder bed to planarize the surface of the powder bed;
an elevator operationally coupled with the platform, wherein the elevator comprises a motor configured to translate the platform in a second direction substantially perpendicular to the first direction;
a processing chamber having one or more walls enclosing an internal volume, which one or more walls is configured to enclose the surface of the powder bed during the printing, wherein the processing chamber includes a ceiling wall;
one or more lasers configured to generate one or more laser beams that (i) melts at least a portion of the powder bed to a molten material as part of the three-dimensional object during the printing, and (ii) forms gas-borne debris within the internal volume of the processing chamber;
one or more windows coupled to the ceiling wall, wherein the one or more windows is configured to transmit the one or more laser beams to the internal volume;
one or more galvanometer scanners configured to move the one or more laser beams in the internal volume of the processing chamber, wherein the one or more galvanometer scanners is external to the internal volume of the processing chamber;
a gas flow system comprising one or more openings disposed in the one or more walls, which gas flow system is operationally coupled with the processing chamber and configured to provide a flow of gas across each of the one or more laser beams, wherein during printing each of the one or more laser beams encounters at least 10 debris particles each having a diameter of 0.5 micrometers or greater, wherein the printing results in the three-dimensional object having a porosity of 1% or less by volume; and
one or more controllers comprising electrical circuitry operationally coupled with the elevator, the layer forming device, the one or more galvanometer scanners, and the gas flow system, which one or more controllers are configured to direct (I) the elevator to translate the platform in the second direction, (II) the layer forming device to translate in the first direction, (III) the one or more galvanometer scanners to direct the one or more laser beams at the powder bed along at least one trajectory, and (IV) the gas flow system to provide the flow of gas.

21. The apparatus of claim 20, wherein the debris particles encountered by the one or more laser beams are within a laser beam volume of each of the one or more laser beams.

22. The apparatus of claim 20, further comprising a build module removably coupled to the processing chamber during the printing, wherein the processing chamber is configured decouple from the build module after the printing.

23. The apparatus of claim 20, wherein during the printing, the gas flow system is configured to change a velocity of the flow of gas within the internal volume during.

24. The apparatus of claim 20, wherein the debris particles comprise at least 10% metal oxide measured as volume per volume.

25. The apparatus of claim 20, wherein during the printing, the apparatus is configured to melt at a rate from 1 to 50 cubic centimeters per hour (cm$^3$/hr) of the molten material per laser.

26. The apparatus of claim 20, wherein the one or more openings is one or more inlet openings, wherein the flow of gas enters the internal volume through the one or more inlet openings and exits the internal volume through one or more outlet openings, which one or more inlet and outlet openings is configured to facilitate movement of the gas-borne debris.

27. The apparatus of claim 26, wherein the one or more inlet openings and/or the one or more outlet openings correspond to openings of a perforated plate, a screen, a mesh or a gas permeable material.

28. The apparatus of claim 26, wherein the one or more inlet openings are within an inlet region coupled to a ceiling of the processing chamber, and the one or more outlet openings are within a side wall or a floor of the processing chamber.

29. The apparatus of claim 26, wherein the one or more inlet openings are within an inlet region coupled to a first side wall of the processing chamber, and the one or more outlet openings are within a second side wall or a floor of the processing chamber.

30. The apparatus of claim 20, wherein during printing, each of the one or more laser beams encounters: from 10 debris particles to 10,000 debris particles each having a size of 0.5 micrometers or greater.

\* \* \* \* \*